(12) United States Patent
Vezina et al.

(10) Patent No.: US 10,406,910 B2
(45) Date of Patent: Sep. 10, 2019

(54) SNOWMOBILE HEAT EXCHANGER ASSEMBLY

(71) Applicant: BOMBARDIER RECREATIONAL PRODUCTS INC., Valcourt (CA)

(72) Inventors: Sebastien Vezina, Sherbrooke (CA); Jonathan Fortier, Lawrenceville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/439,210

(22) Filed: Feb. 22, 2017

(65) Prior Publication Data

US 2017/0158046 A1 Jun. 8, 2017

Related U.S. Application Data

(63) Continuation-in-part of application No. PCT/IB2014/064343, filed on Sep. 9, 2014, which is
(Continued)

(51) Int. Cl.
*B60K 11/02* (2006.01)
*B60K 11/04* (2006.01)
(Continued)

(52) U.S. Cl.
CPC .............. *B60K 11/02* (2013.01); *B60K 11/04* (2013.01); *B62M 27/02* (2013.01); *F28D 1/035* (2013.01);
(Continued)

(58) Field of Classification Search
CPC . B60K 11/02; B62M 27/02; B62M 2027/026; B62M 2027/027;
(Continued)

(56) References Cited

U.S. PATENT DOCUMENTS

| 2,143,171 A | 1/1939 | Anderson |
| 2,766,514 A | 10/1956 | Adams |

(Continued)

FOREIGN PATENT DOCUMENTS

| DE | 102004032353 A1 | 1/2006 |
| JP | 1992059425 A | 2/1992 |

(Continued)

OTHER PUBLICATIONS

International Search Report of PCT/IB2014/064343; Blaine R. Copenheaver; dated Mar. 27, 2015.
(Continued)

*Primary Examiner* — Jacob D Knutson
(74) *Attorney, Agent, or Firm* — BCF LLP

(57) ABSTRACT

A heat exchanger assembly has a front portion, a middle portion rearward of the front portion, a rear portion rearward of the middle portion, a top part and a bottom part disposed below the top part. At least one of the front and rear portions is curved from the middle portion. The at least one of the front and rear portions extends below the middle portion. The bottom part is joined to the top part. At least one of the top and bottom parts defines a recess. The top and bottom parts define therebetween a passage formed in part by the recess. A width of the passage varies along a length of the heat exchanger assembly. The passage has an inlet and an outlet. A snowmobile with a heat exchanger assembly and a method of manufacturing a heat exchanger assembly are also disclosed.

25 Claims, 42 Drawing Sheets

Related U.S. Application Data a continuation of application No. 14/473,036, filed on Aug. 29, 2014, now abandoned.

(60) Provisional application No. 61/872,204, filed on Aug. 30, 2013.

(51) Int. Cl.
    *B62M 27/02* (2006.01)
    *F28D 1/03* (2006.01)
    *F28F 3/12* (2006.01)
    *F28F 3/14* (2006.01)
    *F28D 21/00* (2006.01)

(52) U.S. Cl.
CPC .............. *F28D 1/0358* (2013.01); *F28F 3/12* (2013.01); *F28F 3/14* (2013.01); *B60Y 2200/252* (2013.01); *B62M 2027/023* (2013.01); *B62M 2027/026* (2013.01); *B62M 2027/027* (2013.01); *B62M 2027/028* (2013.01); *F28D 2021/0094* (2013.01)

(58) Field of Classification Search
CPC ............ B62M 2027/028; F28D 1/0358; F28D 2021/0094; F28F 3/12
USPC ......................................................... 180/193
See application file for complete search history.

(56) References Cited

U.S. PATENT DOCUMENTS

| | | |
|---|---|---|
| 2,882,588 A | 4/1959 | Rieppel et al. |
| 2,991,047 A | 7/1961 | Bailys |
| 3,141,500 A | 7/1964 | Raskin |
| 3,734,178 A | 5/1973 | Soudron |
| 3,901,335 A | 8/1975 | Johnson |
| 4,159,740 A | 1/1979 | Seiling |
| 5,050,671 A * | 9/1991 | Fletcher ................ F28D 1/0308 165/148 |
| 5,205,348 A | 4/1993 | Tousignant et al. |
| 5,307,869 A | 5/1994 | Blomgren |
| 5,417,280 A | 5/1995 | Hayashi et al. |
| 5,443,116 A | 8/1995 | Hayashi et al. |
| 5,517,757 A | 5/1996 | Hayashi et al. |
| 5,791,429 A * | 8/1998 | Bergman ................ B62M 27/02 180/190 |
| 5,918,664 A | 7/1999 | Torigoe |
| 5,984,000 A | 11/1999 | Nakamura et al. |
| 5,996,717 A * | 12/1999 | Hisadomi .............. B62M 27/02 180/182 |
| 6,070,428 A | 6/2000 | Higashiyama et al. |
| 6,109,217 A * | 8/2000 | Hedlund .................... F28F 1/12 123/41.01 |
| 6,340,053 B1 | 1/2002 | Wu et al. |
| 6,948,557 B2 | 9/2005 | Higashiyama et al. |
| 6,962,194 B2 | 11/2005 | Martin et al. |
| 7,025,127 B2 | 4/2006 | Wu et al. |
| 7,104,352 B2 | 9/2006 | Weinzierl |
| 7,353,898 B1 * | 4/2008 | Bates, Jr. ............. B60K 5/1208 180/184 |
| 7,543,669 B2 * | 6/2009 | Kelahaara .............. B62M 27/02 180/190 |
| 7,591,332 B1 * | 9/2009 | Bates, Jr. ............. B60K 5/1208 180/184 |
| 7,779,944 B2 * | 8/2010 | Bergman ................ B60K 11/04 180/190 |
| 7,870,920 B1 * | 1/2011 | Dahlgren ............... B62M 27/02 180/190 |
| 8,944,204 B2 * | 2/2015 | Ripley .................... B62M 27/02 180/190 |
| 9,738,301 B2 * | 8/2017 | Vezina .................. B62B 17/063 |
| 9,828,065 B2 * | 11/2017 | Pard ....................... B62M 27/02 |
| 2003/0164233 A1 | 9/2003 | Wu et al. |
| 2005/0115700 A1 | 6/2005 | Martin et al. |
| 2011/0186371 A1 | 8/2011 | Berg et al. |
| 2013/0032418 A1 | 2/2013 | Ripley et al. |
| 2015/0375826 A1 | 12/2015 | Sampson et al. |
| 2016/0152304 A1 * | 6/2016 | Vezina .................. B62M 27/02 180/190 |
| 2016/0368563 A1 * | 12/2016 | Sampson ............... B62M 27/00 |

FOREIGN PATENT DOCUMENTS

| | | | |
|---|---|---|---|
| RU | 2090379 C1 | 9/1997 | |
| RU | 2517918 C2 | 6/2014 | |
| WO | 9301463 A1 | 1/1993 | |
| WO | WO-2016015156 A1 * | 2/2016 | ........ H01M 10/6556 |

OTHER PUBLICATIONS

2005 Polaris 900RMK Cooling/All Options (S05PL8/PM8/PN8); retrieved from http://www.polarispartshouse.com/oemparts/a/pol/503786d7f87002368411ec11/cooling-all-options on Feb. 9, 2017.

English translation of DE102004032353; retrieved from https://worldwide.espacenet.com/ on Feb. 9, 2017.

English translation of JP1992059425; retrieved from https://worldwide.espacenet.com/ on Feb. 9, 2017.

English Machine translation of RU2517918C2 retrieved from http://translationportal.epo.org/ on Jul. 13, 2018.

English Machine translation of RU2090379C1 retrieved from http://translationportal.epo.org/ on Jul. 13, 2018.

Patent Record Quick View Report of RU2090379C1 retrieved from http://www.derwentinnovation.com/ on Jul. 13, 2018 and including an enlarged version of the drawing mentioned in the Patent Description.

Russian Search Report of Corresponding Application No. 2017108314; dated May 21, 2018.

* cited by examiner

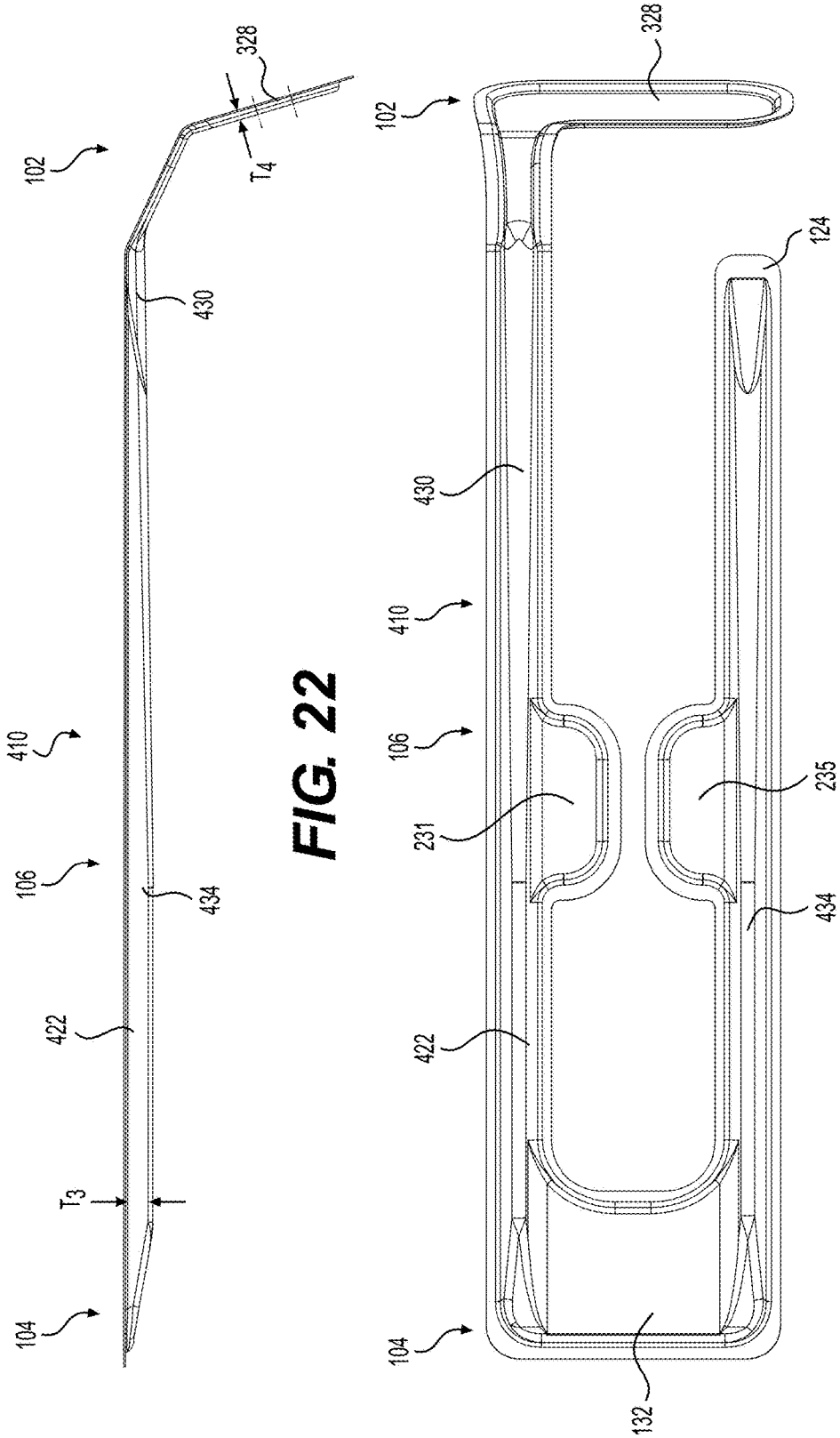

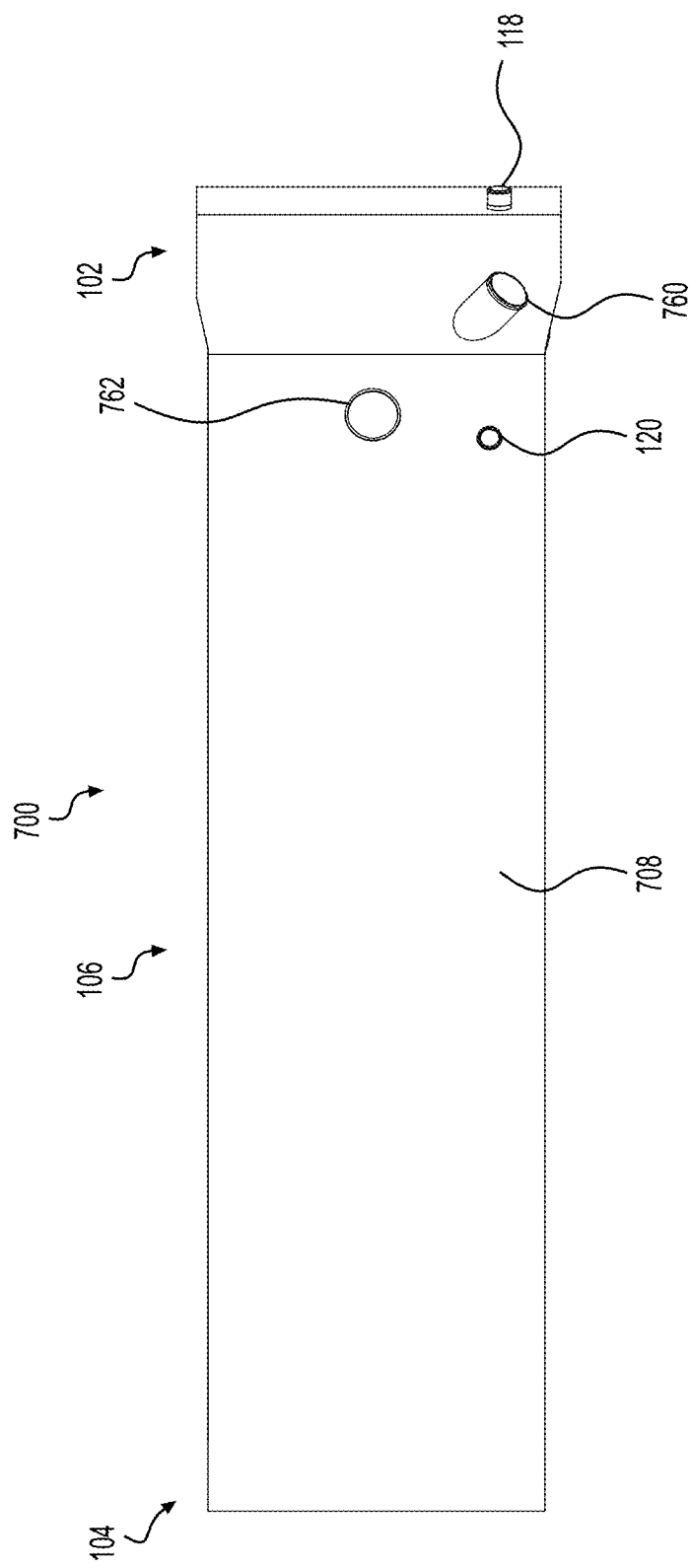

SNOWMOBILE HEAT EXCHANGER ASSEMBLY

CROSS-REFERENCE

The present application is a continuation-in-part of International Patent Application No. PCT/IB2014/064343, filed Sep. 9, 2014. Through International Patent Application No. PCT/IB2014/064343, the present application is a continuation of U.S. patent application Ser. No. 14/473,036, filed Aug. 29, 2014, which claims priority to U.S. Provisional Patent Application No. 61/872,204, filed Aug. 30, 2013. The entirety of these three applications is incorporated herein by reference.

FIELD OF TECHNOLOGY

The present technology relates to heat exchanger assembly for snowmobiles.

BACKGROUND

Snowmobiles are powered by engines that need to be cooled. In some snowmobiles, a coolant is circulated around and through the engine thereby absorbing the heat generated by the engine. When the hot coolant leaves the engine, it needs to be cooled before being returned to the engine. To do so, the coolant is circulated through one or more heat exchanger assemblies.

FIG. 1 illustrates an exemplary implementation of a prior art arrangement of heat exchanger assemblies for a snowmobile. The arrangement includes a front heat exchanger assembly 1000 and a heat exchanger assembly 1002.

The front heat exchanger assembly 1000 has a body 1004 defining an internal volume, an outlet pipe 1006 and an inlet pipe 1008. The pipes 1006, 1008 are welded to the body 1004. Fins 1010 are formed on the back of the body 1004. The front heat exchanger 1000 defines in part a front of a tunnel of the snowmobile.

The heat exchanger assembly 1002 defines in part a top of the tunnel of the snowmobile. The heat exchanger assembly 1002 has a body 1012, and inlet pipe 1014, an outlet pipe 1016, and a connector 1018. Fins 1020 are formed on the bottom of the body 1012. The body 1012 is formed by being extruded. The extrusion process forms two passages 1022, 1024. The connector 1018, also formed by extrusion, is connected to the back of the two passages 1022, 1024 to fluidly connect the two together thereby forming a single passage. The passages 1022, 1024 are capped at their front ends. The inlet pipe 1014 is welded at a front of the passage 1022 and the outlet pipe 1016 is welded at a front of the passage 1024.

A pipe (not shown) connects the inlet pipe 1014 of the heat exchanger assembly 1002 to the engine to receive hot coolant from the engine. Another pipe (not shown) connects the outlet pipe 1016 of the heat exchange assembly 1002 to the inlet pipe 1008 of the heat exchanger assembly 1000 to allow coolant to flow from the heat exchanger assembly 1002 to the heat exchanger assembly 1000. Another pipe (not shown) connects the outlet pipe 1006 of the heat exchanger assembly 1000 to the engine to return cooled coolant to the engine.

During operation of the snowmobile, coolant flows from the engine to the heat exchanger assembly 1002. In the heat exchanger assembly 1002, coolant first flows through the passage 1022, then through the connector 1018, and then through the passage 1024. From the passage 1024 the coolant flows to the heat exchanger assembly 1000. From the heat exchanger assembly 1000, the coolant is returned to the engine.

The coolant in the heat exchanger assemblies 1000, 1002 is cooled by a combination of air flowing along the surfaces of the heat exchanger assemblies 1000, 1002 and snow being projected on the surfaces of the heat exchanger assemblies 1000, 1002 by the drive track of the snowmobile.

Although the arrangement of the heat exchanger assemblies 1000, 1002 effectively cools the coolant of the engine, it has some disadvantages.

First, the heat exchanger assemblies 1000, 1002 are separate from each other, which increases the complexity of their assembly to the snowmobile.

Also, since the body 1012 of the heat exchanger assembly 1002 is extruded, the passages 1022, 1024 need to have a constant cross-sectional area along their lengths. As such, they are not shaped to take mostly advantage of the regions where more cooling can occur such as where the snow is being sprayed by the drive track. Therefore, the overall internal volume of the heat exchanger assembly 1002 is greater than necessary, which results in a larger volume of coolant being provided in the cooling system. Therefore, the snowmobile is heavier than necessary due to the coolant.

Finally, also due to the manner in which the bodies 1004, 1012 of the heat exchanger assemblies 1000, 1002 are manufactured, the pipes 1006, 1008, 1014 and 1016 are welded generally perpendicular to the surfaces on which they are welded. This is because placing the pipes 1006, 1008, 1014 and 1016 at an angle to their respective connection surfaces would make welding difficult. As a result, the pipes 1006, 1008, 1014 and 1016 take more room by being perpendicular then if they were disposed at another angle.

Accordingly, it would be desirable to have a heat exchanger assembly that can replace two heat exchanger assemblies such as the ones described above.

It would also be desirable to have a heat exchanger assembly that takes advantage of areas where more cooling can occur.

It would also be desirable to have a heat exchanger assembly that facilitates the welding of at least one of the inlet and outlet pipes at an angle to the surface to which it is being welded.

SUMMARY

It is an object of the present technology to ameliorate at least some of the inconveniences present in the prior art.

According to one aspect of the present technology, there is provided a heat exchanger assembly having a front portion, a middle portion rearward of the front portion, a rear portion rearward of the middle portion, a top part and a bottom part disposed below the top part. At least one of the front and rear portions is curved from the middle portion. The at least one of the front and rear portions extends below the middle portion. The bottom part is joined to the top part. At least one of the top and bottom parts defines a recess. The top and bottom parts define therebetween a passage formed in part by the recess. A width of the passage varies along a length of the heat exchanger assembly. The passage has an inlet and an outlet.

According to some implementations of the present technology, the front portion is curved from the middle portion.

According to some implementations of the present technology, the rear portion is curved from the middle portion.

According to some implementations of the present technology, the bottom part defines the recess.

According to some implementations of the present technology, the top part defines at least one other recess. The passage is also formed in part by the at least one other recess.

According to some implementations of the present technology, the passage extends longitudinally along a first lateral side of the heat exchanger, then laterally along the rear portion, then longitudinally along a second lateral side of the heat exchanger and then laterally along the front portion.

According to some implementations of the present technology, the passage extends at least in part along the middle portion and the at least one of the front and rear portions.

According to some implementations of the present technology, at least a portion of the passage defined in the middle portion is wider than at least another portion of the passage defined in the middle portion.

According to some implementations of the present technology, at least a portion of the passage is thicker than at least another portion of the passage.

According to some implementations of the present technology, the recess is a first recess and the passage is a first passage. The heat exchanger assembly also has another part defining a second recess. The other part is joined to one of the top and bottom parts. The other part and the one of the top and bottom parts to which the other part is joined define therebetween a second passage formed in part by the second recess. The second passage has another inlet and another outlet. The second passage is fluidly separate from the first passage.

According to some implementations of the present technology, the other part is curved. The other part is joined to the middle portion and the at least one of the front and rear portions that is curved from the middle portion.

According to some implementations of the present technology, the first passage extends at least in part longitudinally along one side of the second passage.

According to some implementations of the present technology, the passage extends at least in part along the front portion. A width of a portion of the passage extending along the front portion is at least three quarters of a width of the front portion.

According to some implementations of the present technology, the inlet of the passage is rearward of the outlet of the passage. From the outlet, the passage extends forwardly then laterally.

According to some implementations of the present technology, the recess extends at least in part along the middle portion and the front portion and is curved to follow a curvature defined by the front portion and the middle portion.

According to another aspect of the present technology, there is provided a snowmobile having a frame having a tunnel, a motor supported by the frame, at least one ski connected to the frame, a rear suspension assembly connected to the tunnel, and a drive track disposed around the rear suspension assembly and at least in part below the tunnel. The drive track is operatively connected to the motor. At least a portion of a top of the tunnel and at least a portion of a front of the tunnel are formed by a heat exchanger assembly adapted to have at least one motor fluid flowing therethrough for cooling the at least one motor fluid. The heat exchanger assembly has a front portion, a middle portion rearward of the front portion, a rear portion rearward of the middle portion, a top part and a bottom part disposed below the top part. The front portion is curved from the middle portion to form the front portion of the tunnel. The front portion extends below the middle portion. The middle and rear portions form the top portion of the tunnel. The bottom part is joined to the top part. At least one of the top and bottom parts defines a recess. The top and bottom parts define therebetween a passage formed in part by the recess. A width of the passage varies along a length of the heat exchanger assembly. The passage has an inlet and an outlet.

According to some implementations of the present technology, the bottom part defines the recess.

According to some implementations of the present technology, the top part defines at least one other recess. The passage is also formed in part by the at least one other recess.

According to some implementations of the present technology, drive sprockets operatively connect the motor to the drive track. The passage extends at least in part along the middle portion and the front portion. A first portion of the passage disposed along the front portion forward of an axis of rotation of the drive sprockets is wider than a second portion of the passage disposed rearward of the axis of rotation of the drive sprockets.

According to some implementations of the present technology, the rear suspension assembly has rear idler wheels and middle idler wheels disposed forward and above the rear idler wheels. At least a portion of the passage defined in the middle portion is wider than at least another portion of the passage defined in the middle portion. The wider portion of the passage defined in the middle portion is disposed at least in part forward of an axis of rotation of the middle idler wheels.

According to some implementations of the present technology, the recess is a first recess and the passage is a first passage adapted to have a first motor fluid flowing therethrough. The heat exchanger assembly also has another part defining a second recess. The other part being joined to one of the top and bottom parts. The other part and the one of the top and bottom parts to which the other part is joined define therebetween a second passage formed in part by the second recess. The second passage has another inlet and another outlet. The second passage is fluidly separate from the first passage. The second passage is adapted to have a second motor fluid flowing therethrough.

According to some implementations of the present technology, the inlet and outlet of the passage fluidly communicate with the motor.

According to one aspect of the present technology, there is provided a method of manufacturing a heat exchanger comprising: curving a front portion of a first part from a middle portion of the first part, the first part being made of sheet metal; curving a front portion of a second part from a middle portion of the second part, a curvature of the second part corresponding to a curvature of the first part, the second part being made of sheet metal; stamping a recess in the second part, a width of the recess varying along a length of the second part; forming first and second apertures in one of the first and second parts; and joining the first part to the second part thereby forming a passage between the recess and the first part, the first aperture fluidly communicating with the passage to form an inlet of the passage, the second aperture fluidly communicating with the passage to form an outlet of the passage.

According to some implementations of the present technology, the method further comprises stamping a recess in the first part. The passage is also formed between the second part and the recess in the first part.

According to some implementations of the present technology, joining the first part to the second part includes welding the second part to the first part.

According to some implementations of the present technology, welding the second part to the first part includes welding a periphery of the recess to the first part.

According to some implementations of the present technology, the first and second apertures are formed in the first part.

According to some implementations of the present technology, the method further comprises stamping a protrusion in the one of the first and second parts in which the first and second apertures are formed. Forming the first and second apertures in the one of the first and second parts includes forming one of the first and second apertures in the protrusion.

According to some implementations of the present technology, the method further comprises welding a pipe to the protrusion around the one of the first and second apertures.

According to some implementations of the present technology, an initial thickness of the sheet metal forming the first part is equal to an initial thickness of the sheet metal forming the second part.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as a heat exchanger assembly for example, should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 22 is a right side elevation view of the bottom part of the heat exchanger assembly of FIG. 21;

FIG. 23 is a bottom plan view of the bottom part of the heat exchanger assembly of FIG. 21;

FIG. 33 is a top plan view of the heat exchanger assembly of FIG. 32;

DETAILED DESCRIPTION

Figure 1:
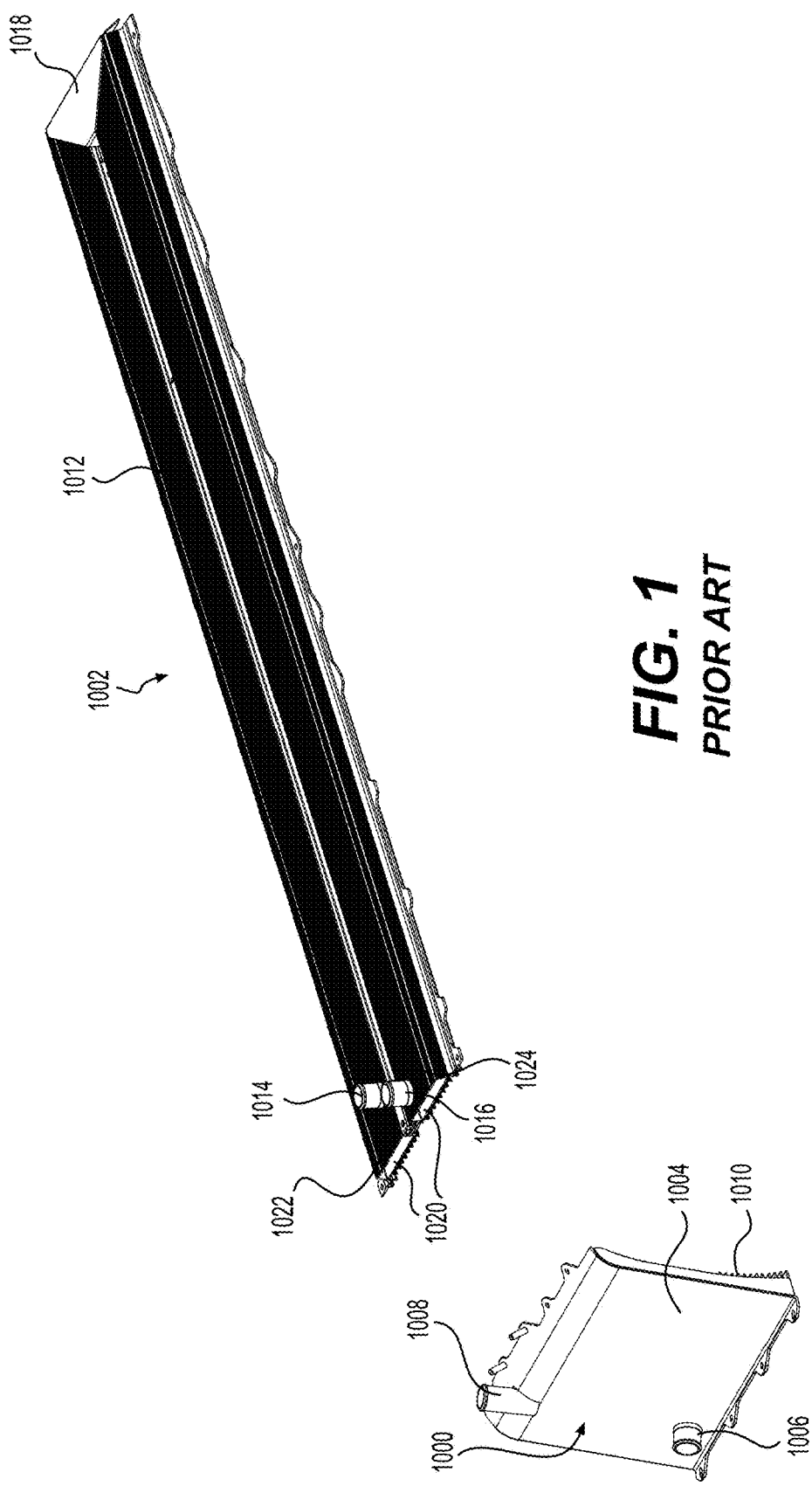
FIG. 1 is a perspective view taken from a top, front, left side of a prior art arrangement of heat exchanger assemblies.
Figure 2:
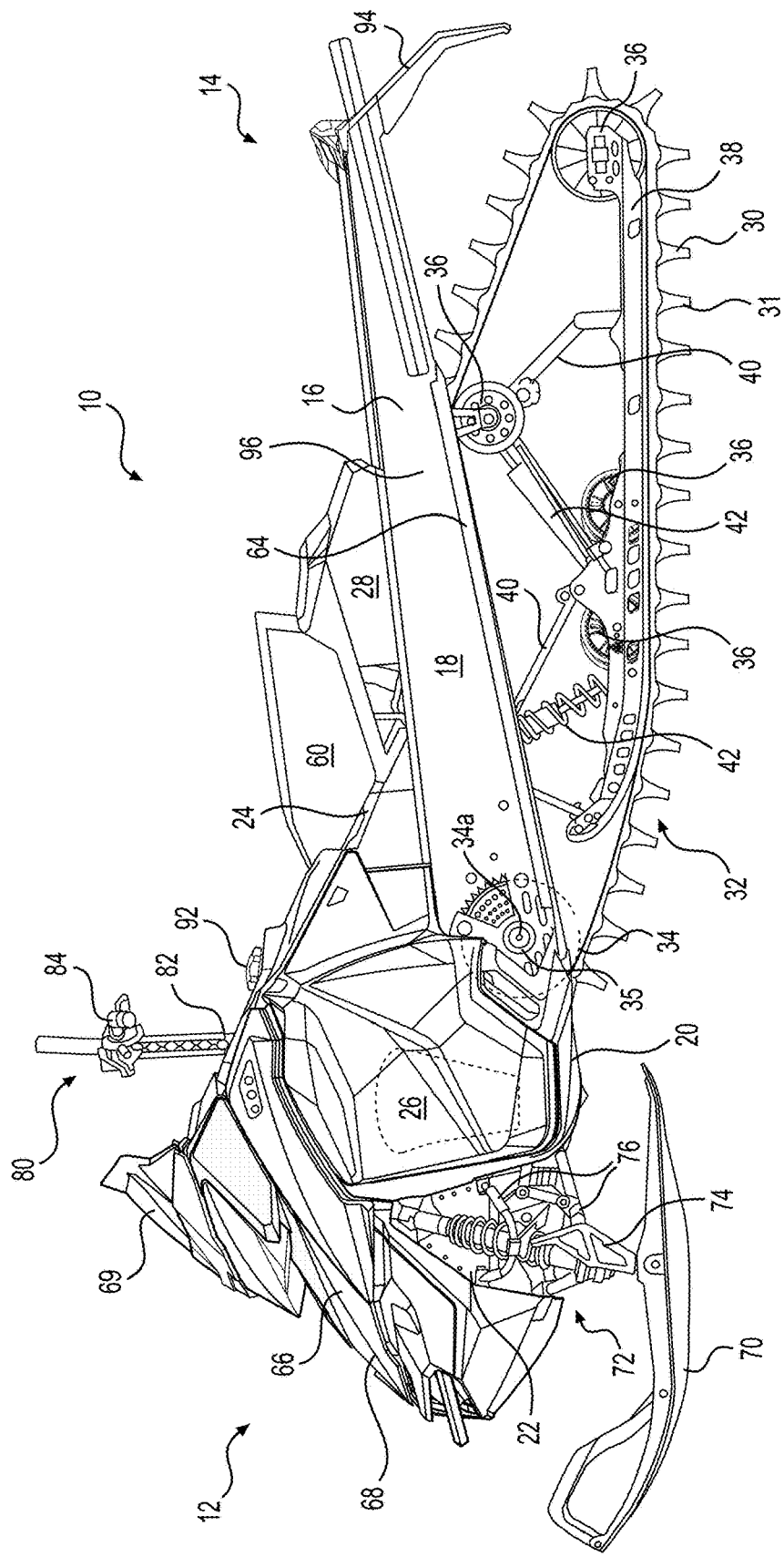
FIG. 2 is a left side elevation view of a snowmobile.
Figure 3:
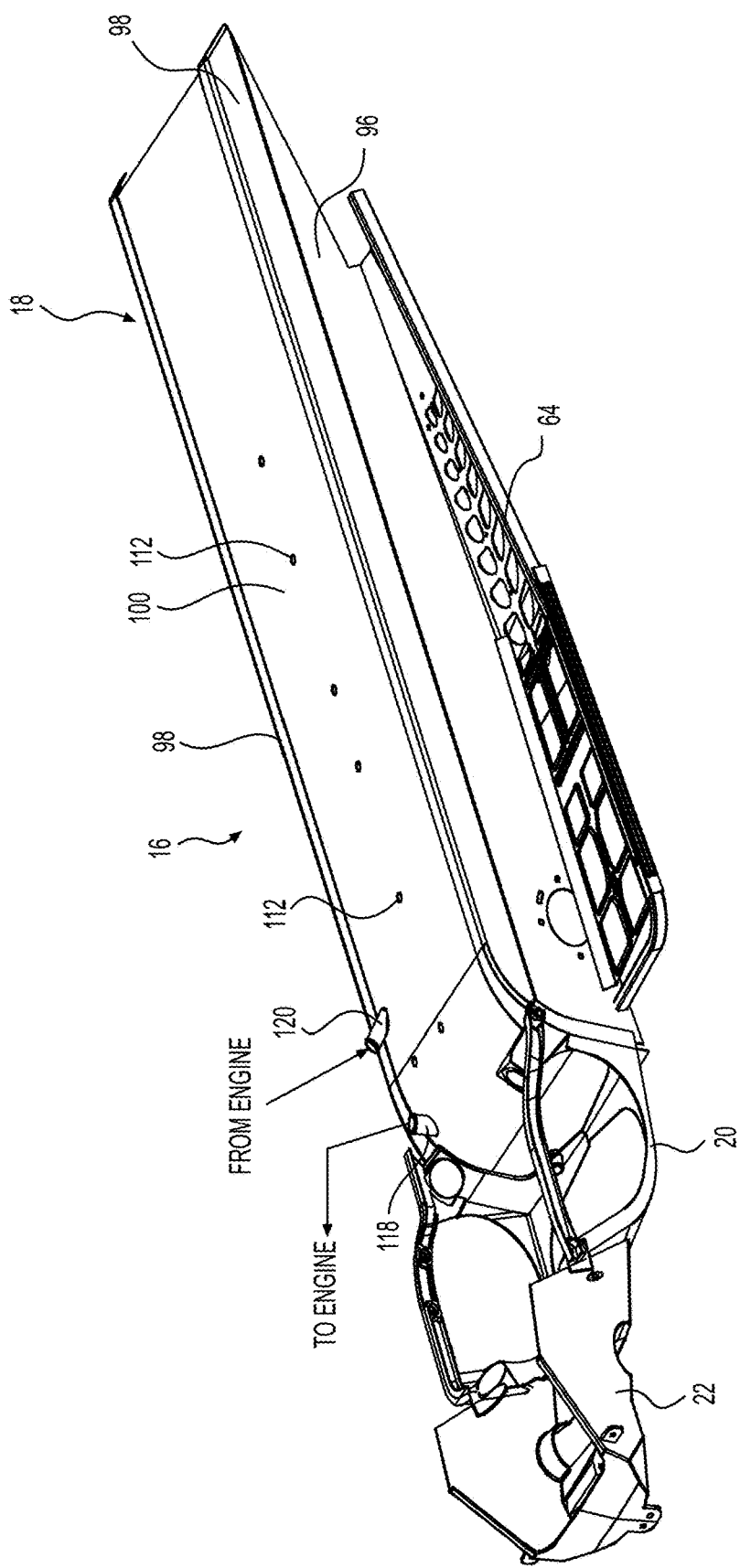
FIG. 3 is a perspective view taken from a top, front, left side of a portion of the frame of the snowmobile of FIG. 2.
Figure 4:
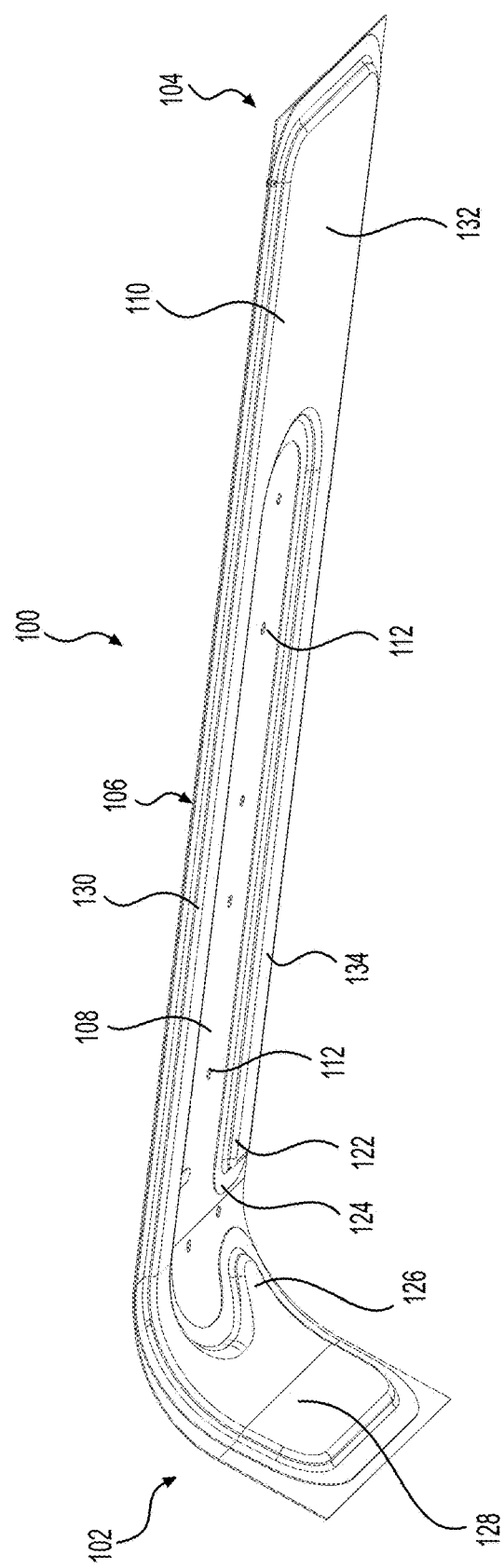
FIG. 4 is a perspective view taken from a bottom, rear, left side of a first implementation of a heat exchanger assembly of the snowmobile of FIG. 2.
Figure 5:
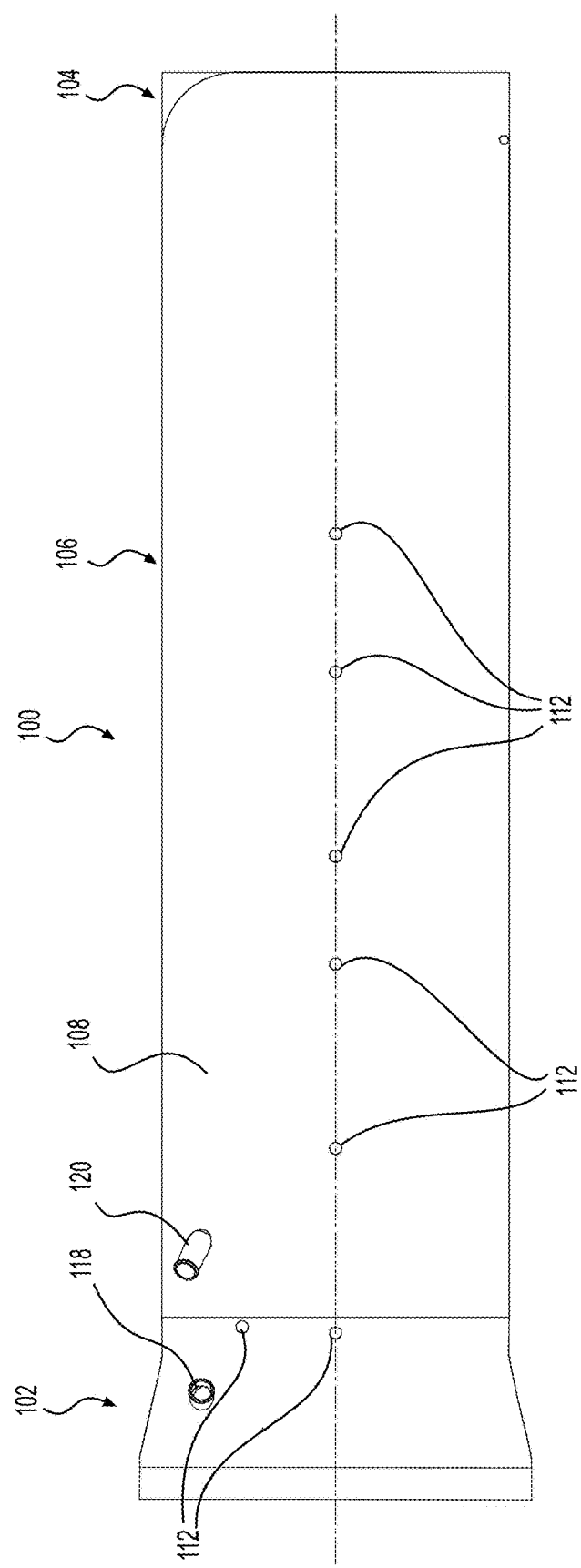
FIG. 5 is a top plan view of the heat exchanger assembly of FIG. 4.

Referring to FIG. 2, a snowmobile 10 includes a forward end 12 and a rearward end 14. The snowmobile 10 includes a vehicle body in the form of a frame or chassis 16 which, as can be seen in FIGS. 2 and 3, includes a tunnel 18, an engine cradle portion 20, a front suspension module 22 and an upper structure 24.

A motor 26 (schematically illustrated in FIG. 2), which in the illustrated implementation is an internal combustion engine, is carried in an engine compartment defined in part by the engine cradle portion 20 of the frame 16. A fuel tank 28, supported above the tunnel 18, supplies fuel to the engine 26 for its operation. Coolant used to cool the engine 26 is circulated through a heat exchanger assembly 100 (FIG. 3), described in greater detail below, to be cooled. The heat exchanger assembly 100 forms part of the tunnel 18.

An endless drive track 30 is disposed generally under the tunnel 18. The drive track 30 is operatively connected to the engine 26 through a belt transmission system (not shown) and a reduction drive (not shown). The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30.

The rear suspension assembly 32 includes drive sprockets 34, idler wheels 36 and a pair of slide rails 38 in sliding contact with the endless drive track 30. The drive sprockets 34 are mounted on a drive axle 35 and define a sprocket axis 37. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle-type seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26 and the belt transmission system when this is required, for example, for inspection or maintenance of the engine 26 and/or the transmission system. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator (not shown) in the form of a finger-actuated throttle lever is mounted to the right side of the handlebar 84. Other types of throttle operators, such as a thumb-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

Turning now to FIG. 3, the tunnel 18 will be described in more detail. The tunnel 18 has two side portions 96. Each side portion 96 is made from a bent piece of sheet metal. Each side portion has a horizontally extending top portion 97 (FIG. 36) and is bent at its bottom to form a rear part of the footrest 64. The heat exchanger assembly 100 rests on the top portions 97 between the side portions 96, thereby forming a majority of the top and front of the tunnel 18. The heat exchanger assembly 100 is fastened, welded or otherwise connected to the side portions 96. Trims 98 are disposed near the top of each side portion 96 to hide the connection between the heat exchanger assembly 100 and the side portions 96 of the tunnel 18.

Figure 10:
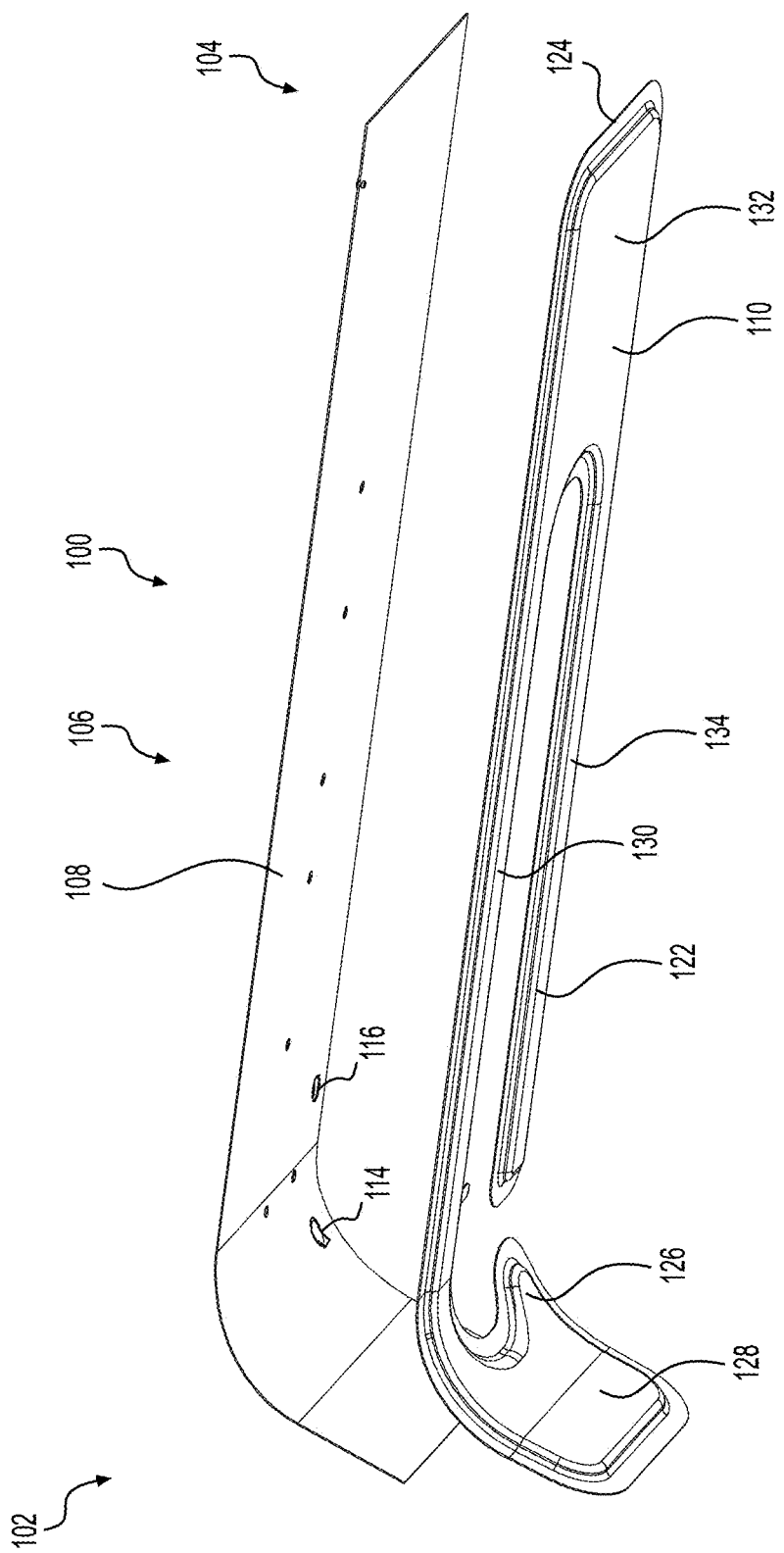
FIG. 10 is an exploded view of the heat exchanger assembly of FIG. 4.
Figure 11:
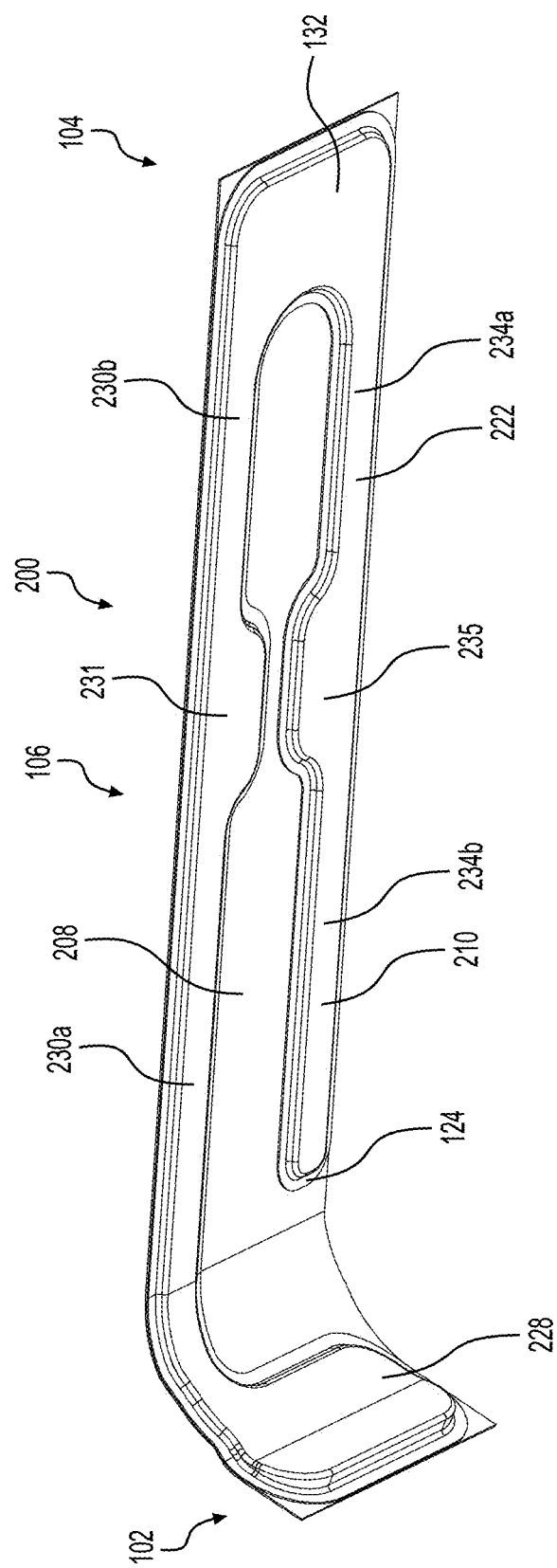
FIG. 11 is a perspective view taken from a bottom, rear, left side of a second implementation of a heat exchanger assembly of the snowmobile of FIG. 2.
Figure 12:
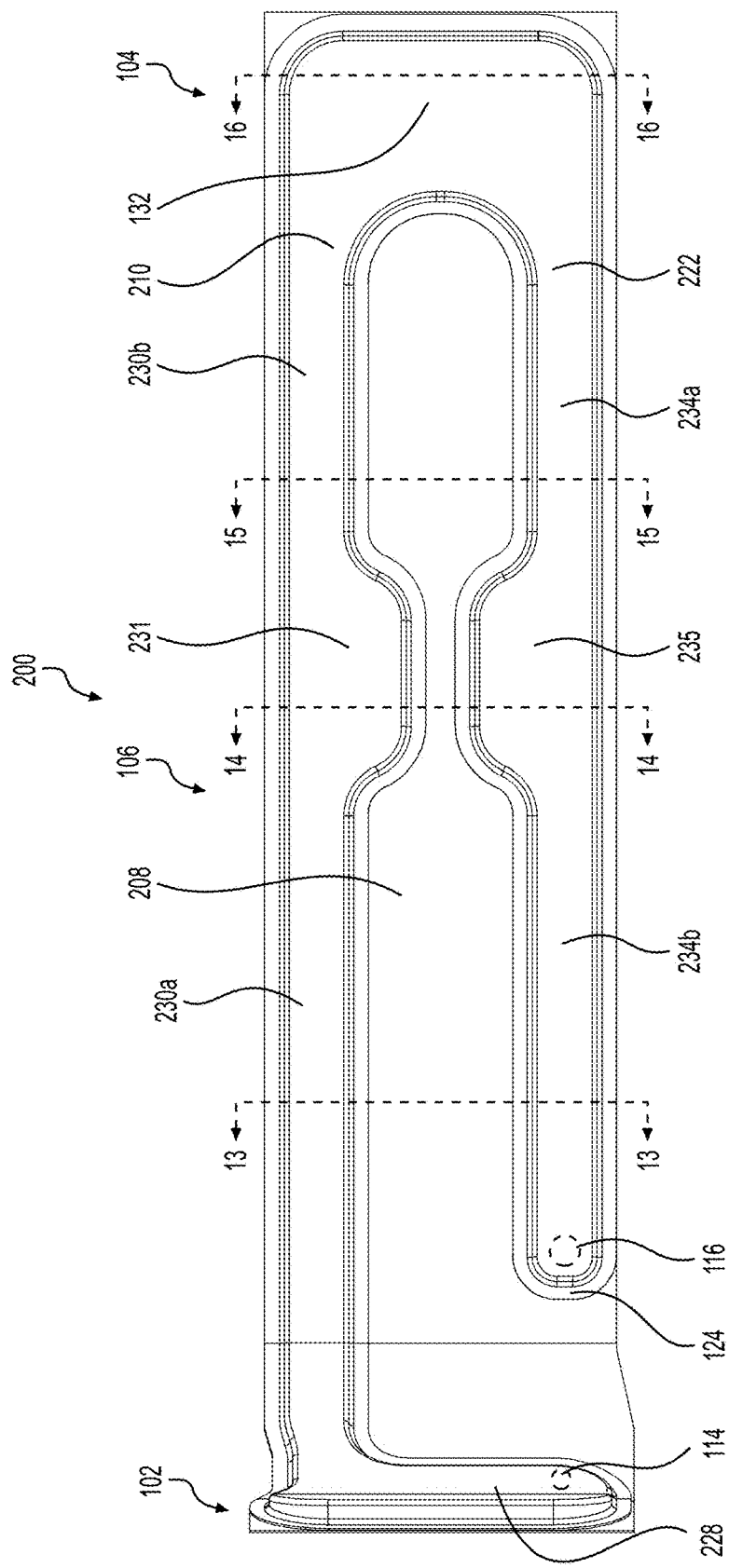
FIG. 12 is a bottom plan view of the heat exchanger assembly of FIG. 11.
Figure 13:
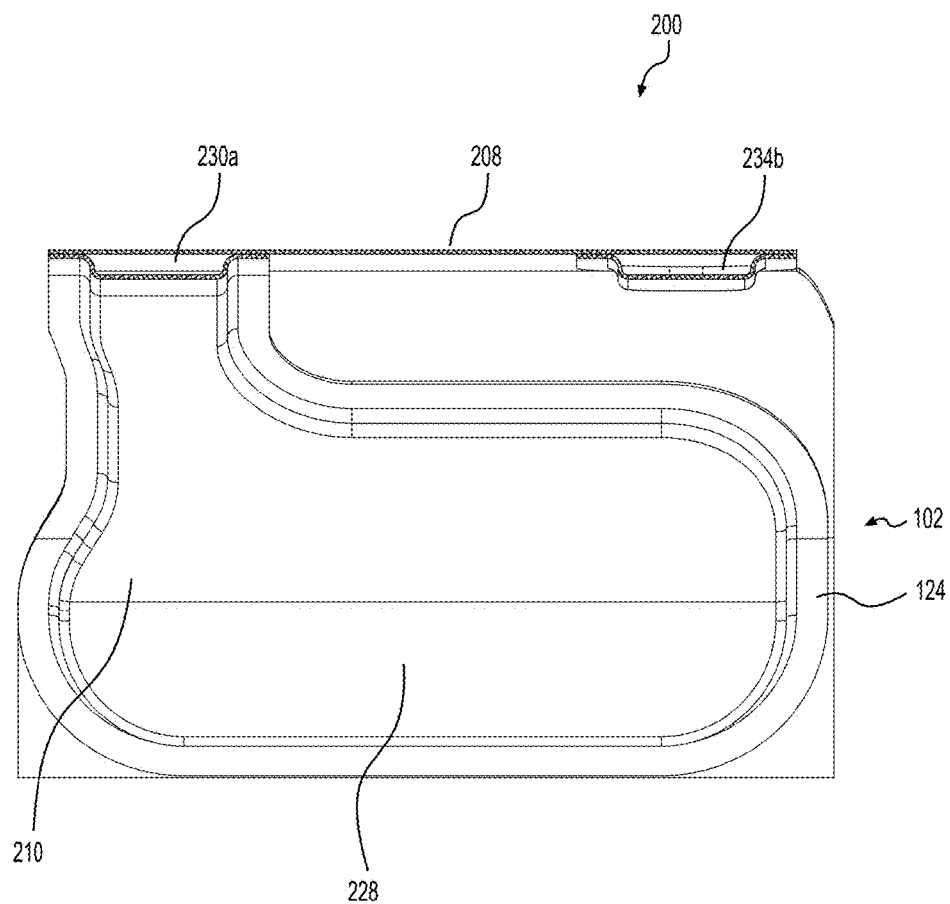
FIG. 13 is a cross-sectional view of the heat exchanger assembly of FIG. 11 taken through line 13-13 of FIG. 12.
Figure 14:
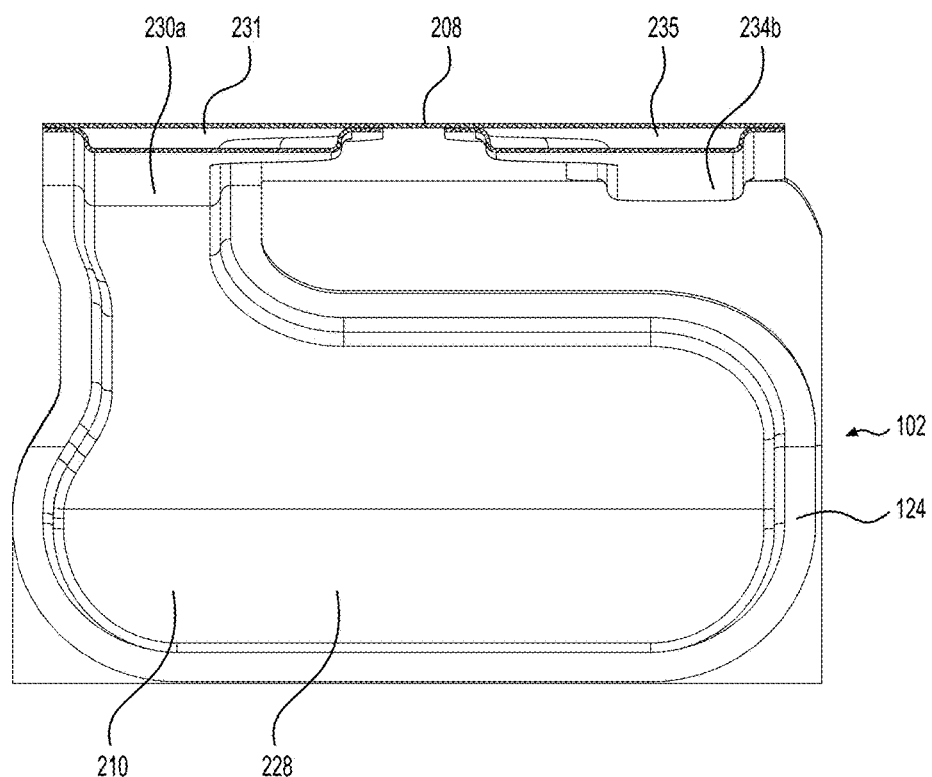
FIG. 14 is a cross-sectional view of the heat exchanger assembly of FIG. 11 taken through line 14-14 of FIG. 12.
Figure 15:
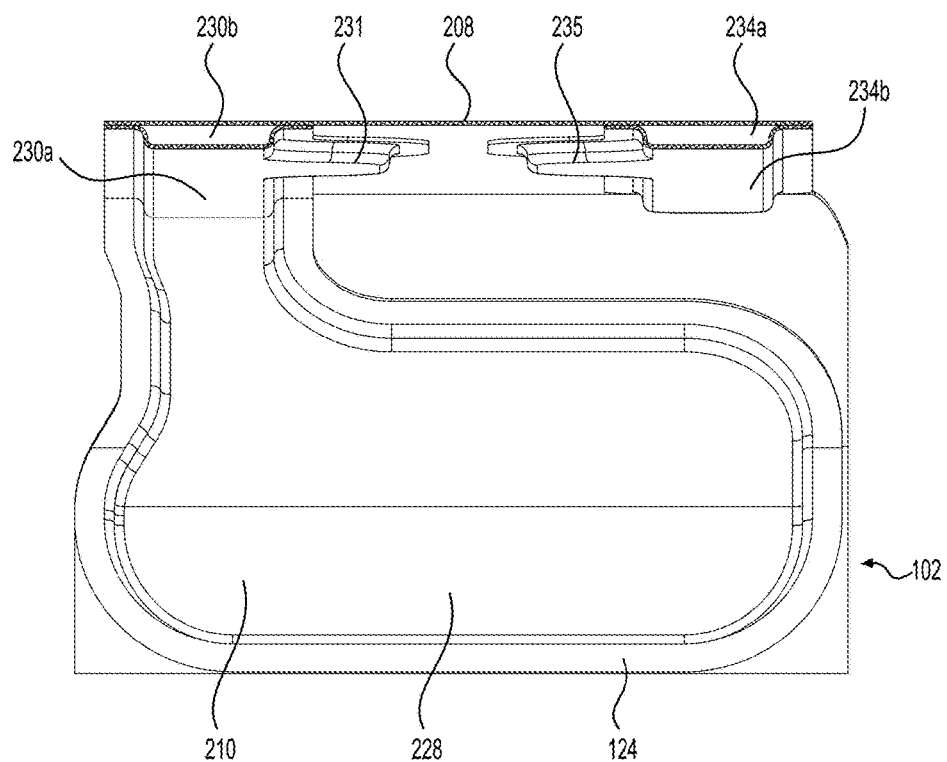
FIG. 15 is a cross-sectional view of the heat exchanger assembly of FIG. 11 taken through line 15-15 of FIG. 12.
Figure 16:
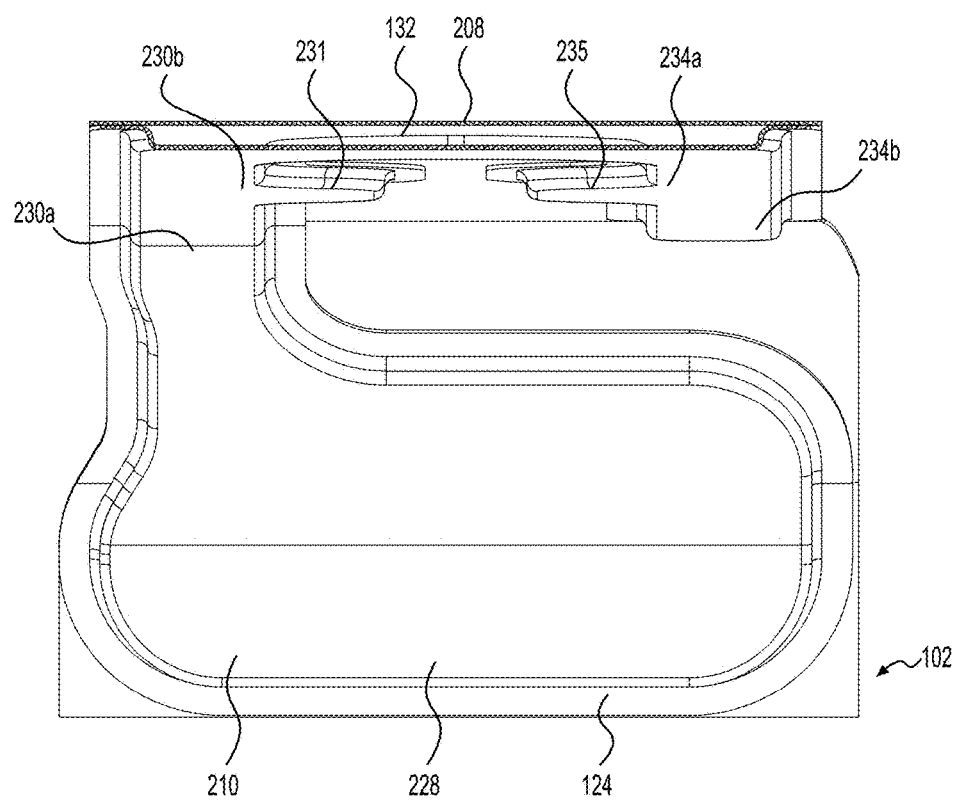
FIG. 16 is a cross-sectional view of the heat exchanger assembly of FIG. 11 taken through line 16-16 of FIG. 12.

Turning now to FIGS. 4 to 10, the heat exchanger assembly 100 will be described in more detail. The heat exchanger assembly 100 has a front portion 102, a rear portion 104 and a middle portion 106 between the front and rear portions 102, 104. As can be seen, the front portion 102 is curved down from the middle portion 106 such that the front portion 102 extends below the middle portion 106. As best seen in FIG. 10, the heat exchanger assembly 100 is made of two main parts: a top part 108 and a bottom part 110.

The top part 108 is made of a piece of sheet metal that is curved down at its front. The front portion of the top part 108 is flat, and then curves to the middle portion of the top part 108. The middle and rear portion of the top part 108 are flat. A plurality of apertures 112 (only some of which are labeled for clarity) are formed in the top part 108 to permit the attachments of various components of the snowmobile 10 to the heat exchanger assembly 100 such as the fuel tank 28. As can be seen in FIG. 10, an aperture is formed in the curved portion of the top part 108 to form an outlet 114 of a passage (discussed below) of the heat exchanger assembly 100. As can be also seen in FIG. 10, another aperture is formed in the middle portion of the top part 108 rearward of the outlet 114 to form an inlet 116 of the passage of the heat exchanger assembly 100. It is contemplated that the outlet 114 could be disposed rearward of the inlet 116 or that they could be at a same distance from the front of the top part 108. Although shown on the right side near a front of the top part 108, it is contemplated that the outlet 114 and inlet 116 could be anywhere on the top part 108 as long as the geometry of the passage discussed below is modified accordingly. An outlet pipe 118 is welded or otherwise joined to the top part 108 around the outlet 114 and an inlet pipe 120 is welded or otherwise joined to the top part 108 around the inlet 116.

The bottom part 110 is made of a piece of sheet metal that is curved down at its front such that its curvature matches the curvature of the top part 108. Once curved, the bottom part 110 is stamped to form a recess 122. The piece of sheet metal from which the bottom part 110 is made is initially shaped such that only a border 124 is left around the recess 122, thereby reducing the weight of the bottom part 110. Alternatively, it is contemplated that the sheet metal could be cut after the recess 122 has been formed so as to only leave the border 124 around the recess 122. It is also contemplated that the sheet metal could not be cut. The border 124 of the bottom part 110 is welded or otherwise joined to the top part 108 to form the heat exchanger assembly 100. Additional details regarding the method of manufacturing the heat exchanger assembly 100 will be provided further below.

By joining the top part 108 to the bottom part 110, a passage is formed between the recess 122 and the top part 108. The recess 122 defines the shape of the passage. This passage permits the flow of engine coolant through the heat exchanger assembly 100. Although in the present implementation the heat exchanger 100 is used to cool engine coolant, it is contemplated that it could be used to cool other motor fluids such as, for example, oil used to lubricate the engine 26 or air to be supplied to the engine 26.

During operation of the engine 26, the hot engine coolant flows from the engine 26 through a pipe (not shown) connected to the inlet pipe 120, then through the inlet pipe 120 and then into the passage formed between the top and bottom parts 108, 110 via the inlet 116.

Figure 6:
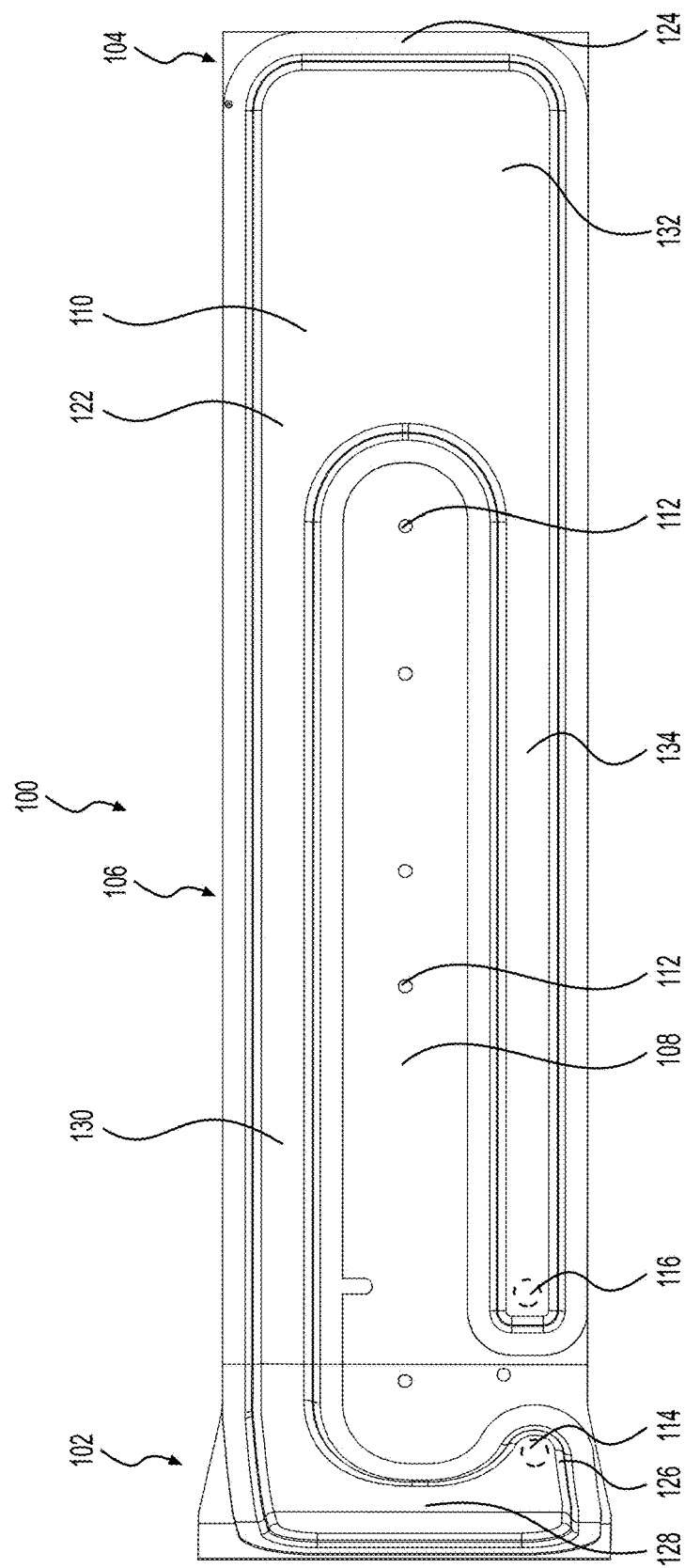
FIG. 6 is a bottom plan view of the heat exchanger assembly of FIG. 4.
Figure 7:
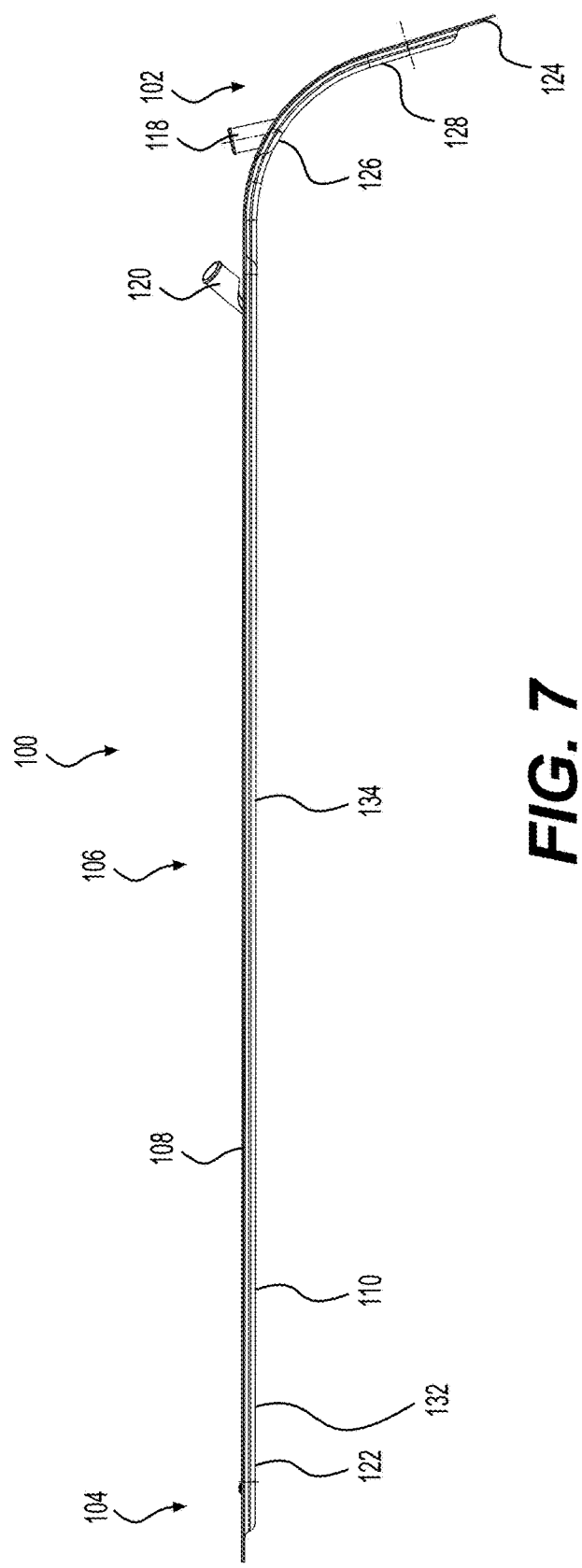
FIG. 7 is a right side elevation view of the heat exchanger assembly of FIG. 4.
Figure 8:
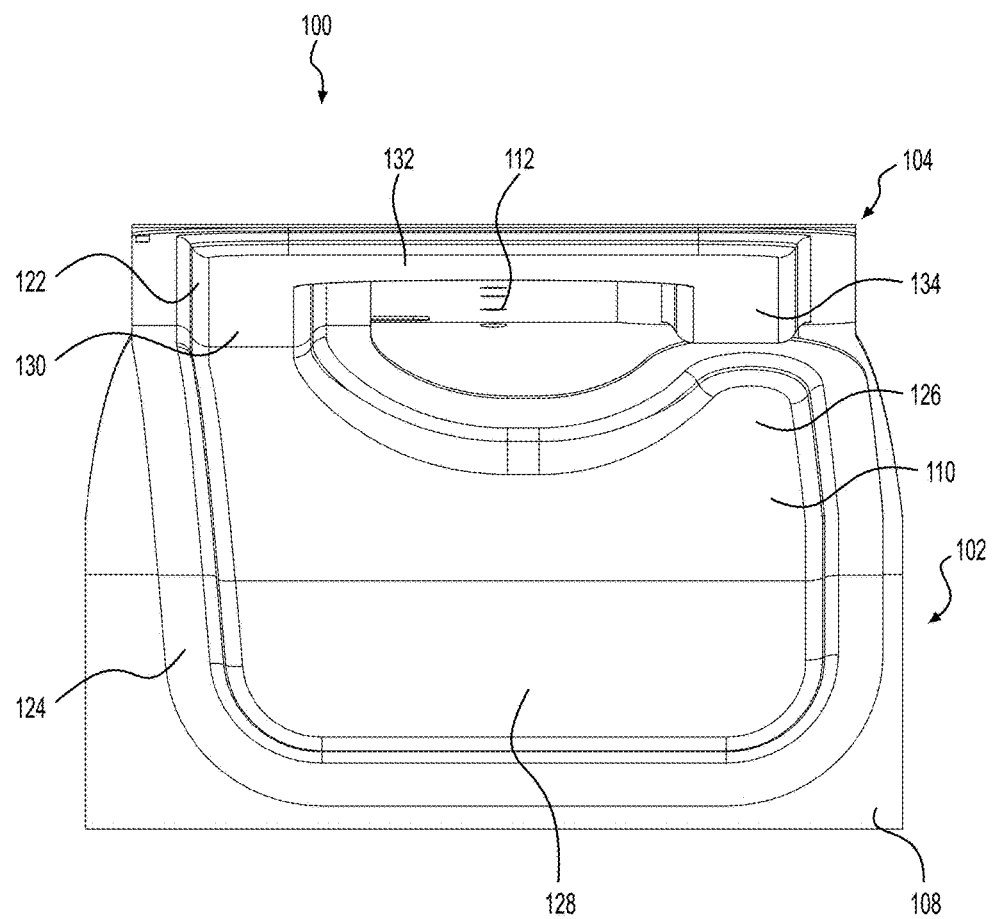
FIG. 8 is a rear elevation view of the heat exchanger assembly of FIG. 4.
Figure 9:
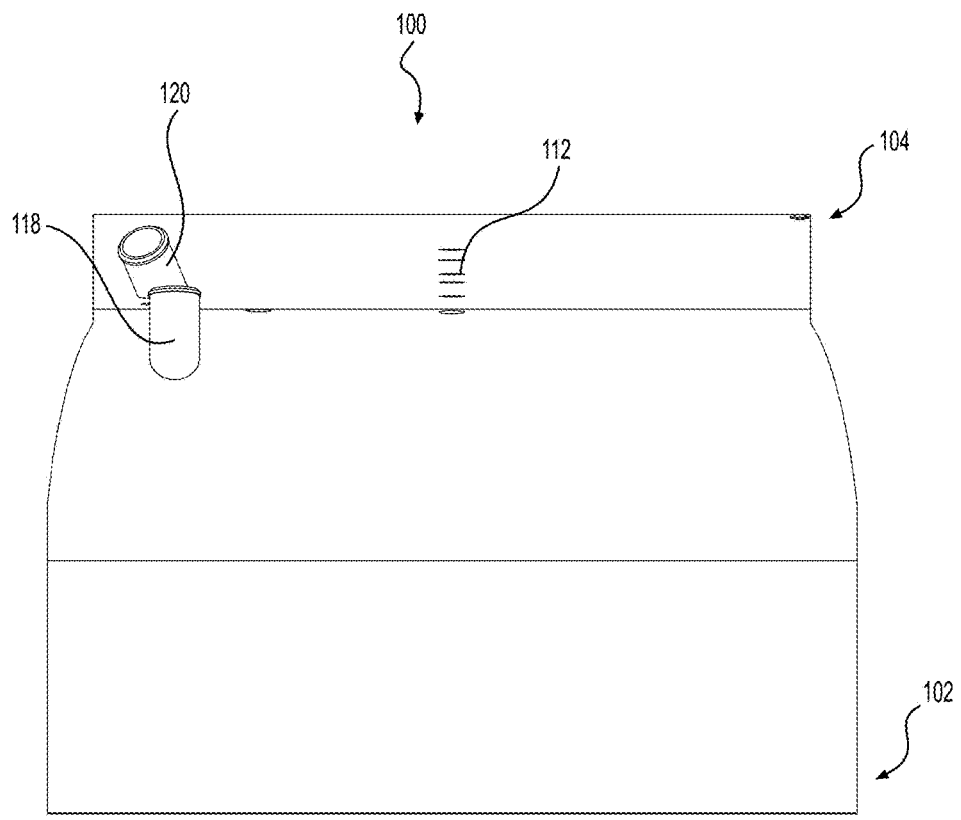
FIG. 9 is a front elevation view of the heat exchanger assembly of FIG. 4.

As can be seen in FIG. 6, the inlet 116 (shown in dotted lines) is disposed over a front of a narrow portion 134 of the passage. From the inlet 116, the coolant flows rearward into the narrow and long portion 134 of the passage defined by a narrow part of the recess 122 and extending along the middle portion 106 on a right side thereof.

From the portion 134 of the passage, the coolant flows rearward and laterally into a portion 132 of the passage defined by a wide part of the recess 122 along the rear portion 104 of the heat exchanger assembly 100. In an exemplary implementation, a width of the passage in the portion 132 is at least three quarters of the width of the top part 108 in the rear portion 104. The portion 132 of the passage is located above the rear idler wheels 36A (see FIG. 17). As the track 30 passes around the rear idler wheels 36A, it projects snow onto the portion of the bottom part 110 defining the portion 132 of the passage. Making the portion 132 wide and long increases the amount of cooling obtained from this projected snow since a large surface is exposed to the projected snow.

From the portion 132 of the passage, the coolant flows forward into a narrow and long portion 130 of the passage defined by a narrow part of the recess 122 and extending along the middle portion 106 on a left side thereof.

From the portion 130, the coolant flows forwardly and then laterally into a portion 128 of the passage defined by a wide part of the recess 122 along the front portion 102 of the heat exchanger assembly 100. As can be seen, the portion 128 of the passage is curved to follow a curvature of the top part 108. In an exemplary implementation, a width of the passage in the portion 128 is at least three quarters of the width of the top part 108 in the front portion 102. The portion 128 of the passage is located forwardly of the sprocket axis 37 (i.e. the axis of rotation of the sprockets 35). As the track 30 passes around the sprockets 35, it projects snow onto the portion of the bottom part 110 defining the portion 128 of the passage. Making the portion 128 wide and long increases the amount of cooling obtained from this projected snow since a large surface is exposed to the projected snow.

From the portion 128 of the passage, the coolant flows rearward into a narrow portion 126 of the passage above which the outlet 114 is located (shown in dotted lines in FIG. 6). The coolant then flows out of the passage via the outlet 114, through the outlet pipe 118 and finally through a pipe (not shown) connected between the outlet pipe 118 and the engine 26 to return the now cooled coolant to the engine 26.

Turning now to FIGS. 11 to 37, various alternative implementations of the heat exchanger assembly 100 will be described. For simplicity, the elements of each of the heat exchanger assemblies described below which are similar to those of the heat exchanger assembly 100 or to elements of another one of the heat exchanger assemblies described below have been labelled with the same reference numerals and will not be described again in detail.

Turning now to FIGS. 11 to 19, a heat exchanger assembly 200 will be described. The heat exchanger assembly 200 has a top part 208 and a bottom part 210. The bottom part 210 defines a recess 222. A passage is formed between the recess 222 and the top part 208. In the heat exchanger assembly 200, the portions 126 and 128 of the passage of the heat exchanger assembly 100 have been replaced by a single portion 228. The portion 228 is similar in shape to the portion 128 described above except that, as best seen in FIG. 17, the bottom part of the portion 228 has a thickness T1 that is greater than a thickness T2 of the rest of the passage.

In the heat exchanger assembly 200, the portion 134 of the passage of the heat exchanger assembly 100 has been replaced by two long and narrow portions 234A, 234B and a wide portion 235 between the portions 234A, 234B. As can be seen by comparing FIGS. 13 to 16, the portion 235 is wider than the portions 234A and 234B, but narrower than the portion 132. Coolant flows from the inlet 116 (shown in dotted lines in FIG. 12) to the portion 234B, to the portion 235, then to the portion 234A and then to the portion 132.

In the heat exchanger assembly 200, the portion 130 of the passage of the heat exchanger assembly 100 has been replaced by two long and narrow portions 230A, 230B and a wide portion 231 between the portions 230A, 230B. As can be seen by comparing FIGS. 13 to 16, the portion 231 is wider than the portions 230A and 230B, but narrower than the portion 132. Coolant flows from the portion 132 to the portion 230B, to the portion 231, then to the portion 230A and then to the portion 228.

Figure 17:
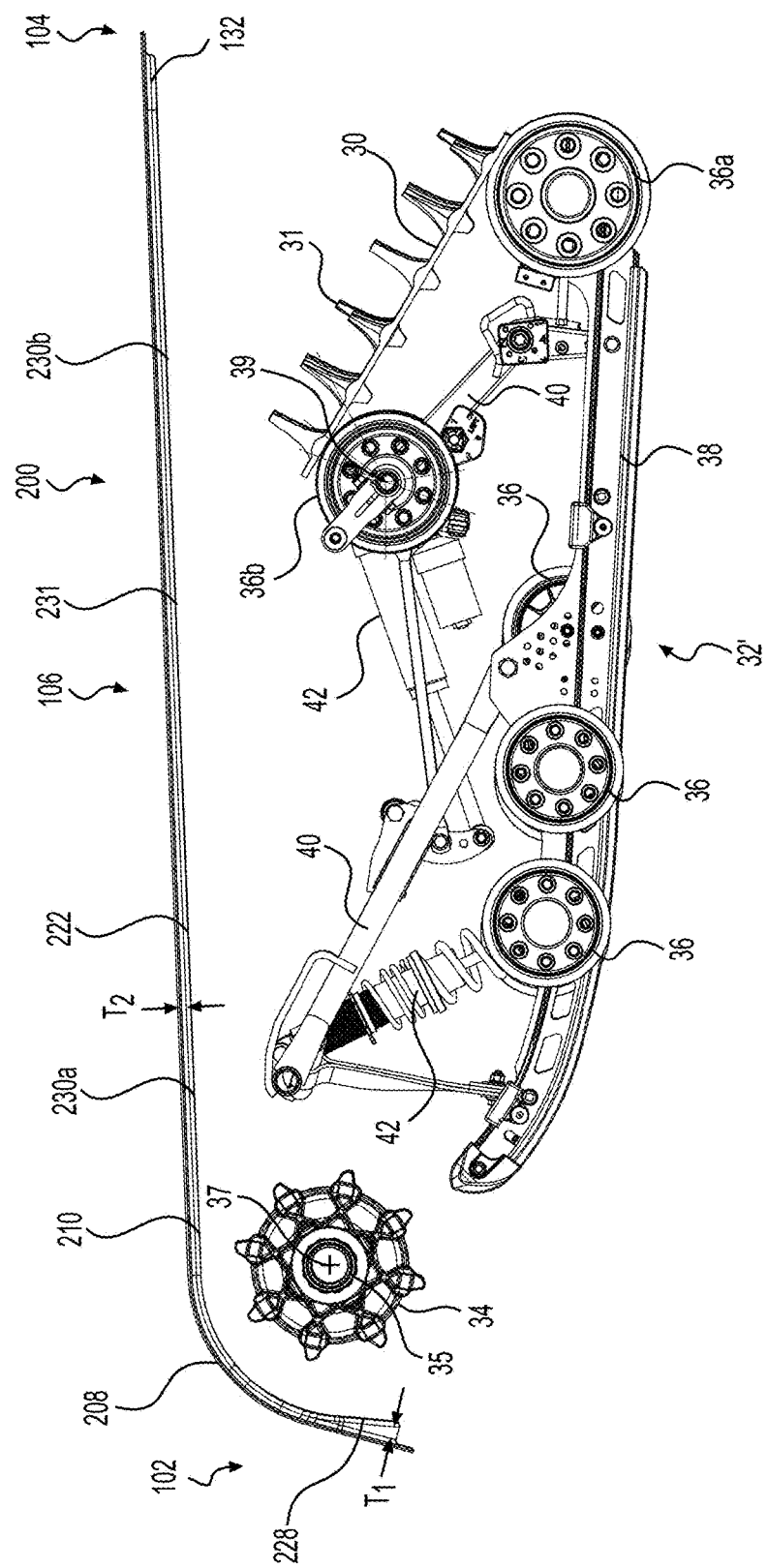
FIG. 17 is a left side elevation view of a drive sprocket, an alternative implementation of a suspension assembly and a portion of a drive track of the snowmobile of FIG. 2 and the heat exchanger assembly of FIG. 11.
Figure 18:
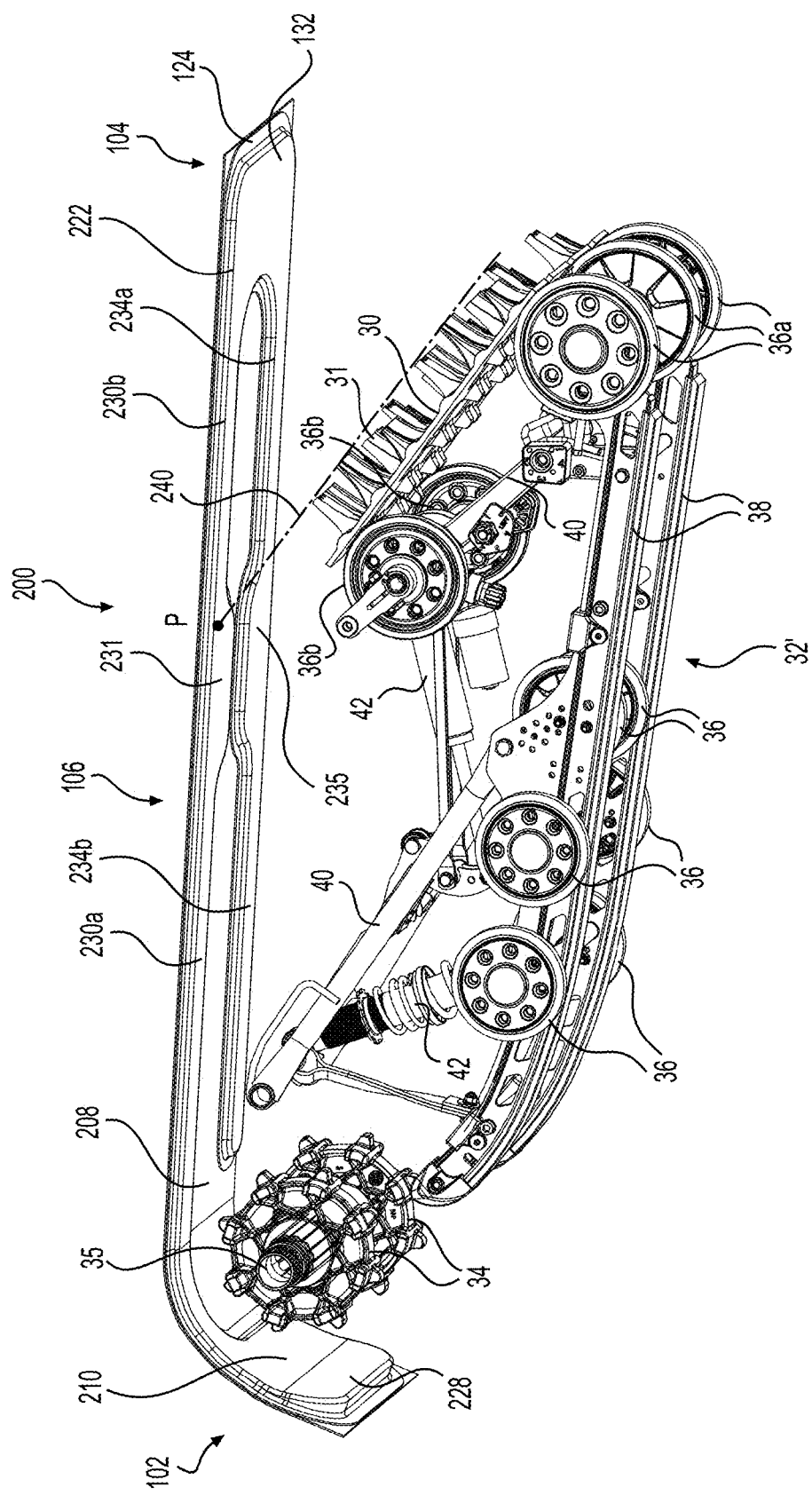
FIG. 18 is a perspective view taken from a bottom, rear, left side of the components of FIG. 17.
Figure 19:
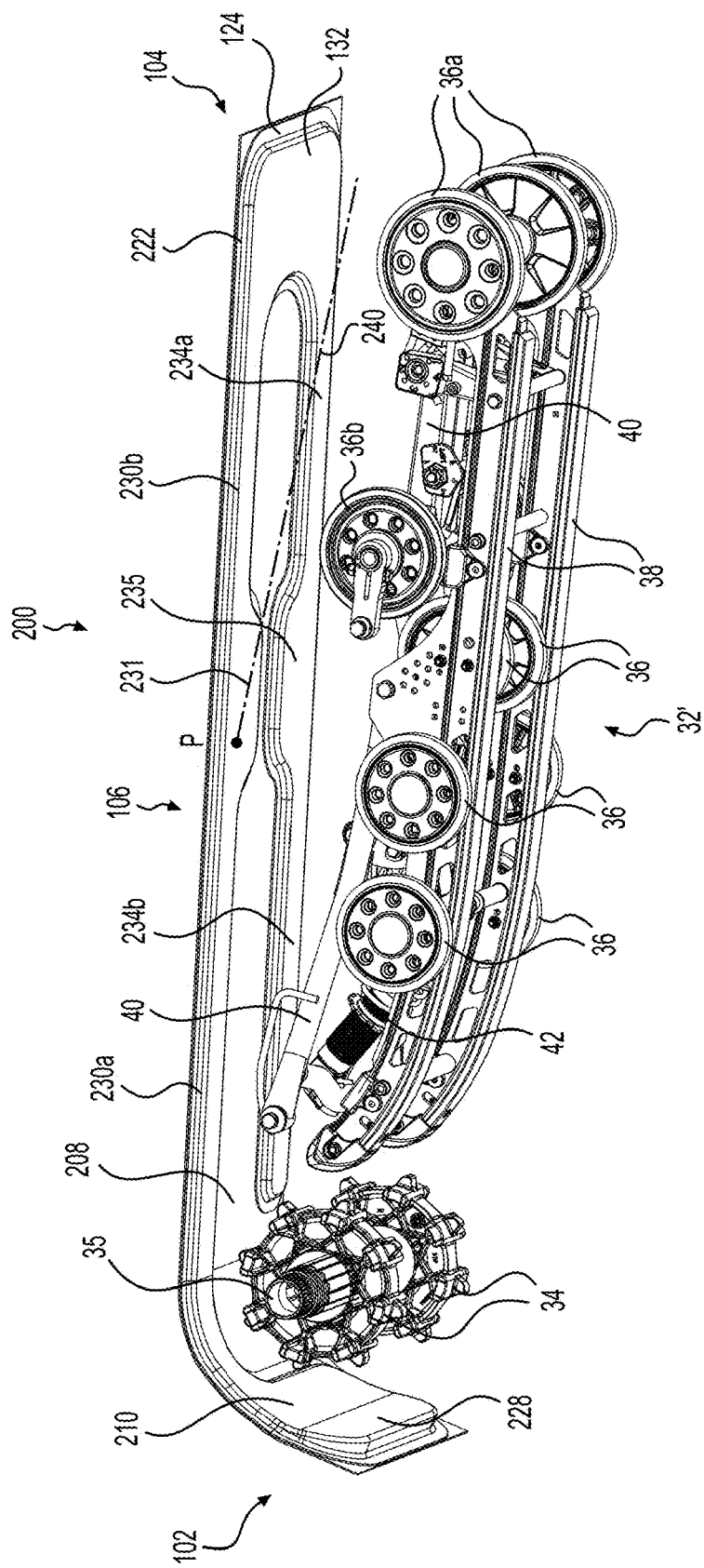
FIG. 19 is a perspective view taken from a bottom, rear, left side of the components of FIG. 17 with the track portion removed and the suspension assembly in a compressed configuration.

FIGS. 17 to 19 show the heat exchanger assembly 200 in relation to a rear suspension assembly 32'. The rear suspension assembly 32' has main components that are similar to those of the rear suspension assembly 32 described above, but they are connected to each other differently. As the differences between the rear suspension assemblies 32 and 32' are not essential to the understanding of the operation of the heat exchanger assembly 200 they will not be described herein. The rear suspension assembly 32' has middle idler wheels 36B that are disposed forward and above the rear idler wheels 36A. The middle idler wheels 36B rotate about an axis of rotation 39.

The wider portions 231 and 235 of the passage of the heat exchanger assembly 200 are disposed along the middle portion 106 forward of the axis of rotation 39 of the middle idler wheels 36B such that as the track 30 passes around the middle idler wheels 36B, it projects snow onto the portions of the bottom part 210 defining the portions 231 and 235 of the passage. Making the portions 231 and 235 wide increases the amount of cooling obtained from this projected snow since a large surface is exposed to the projected snow. In the present implementation, the portions 231 and 235 are disposed so as to extend both forward and rearward of a point P where a line 240 intersects the heat exchanger assembly 200 for all or most degrees of compression of the rear suspension assembly 32' in order help ensure that snow is projected on at least part of the portions 231 and 235 for all or most degrees of compression of the rear suspension assembly 32'. The line 240 is a line that passes through the tops of lugs 31 disposed in a common row along a portion of the track 30 extending between the rear and middle idler wheels 36A, 36B. As can be seen in FIGS. 18 and 19, the portions 231 and 235 extend forward and rearward of the point P when the rear suspension assembly 32' is fully extended (FIG. 18) and when the rear suspension assembly 32' is fully compressed (FIG. 19).

The top portion 208 of the heat exchanger assembly 200 is similar to the top portion 108 described above except that the outlet 114 has been moved forward in order to be aligned with the portion 228 of the passage.

Figure 20:
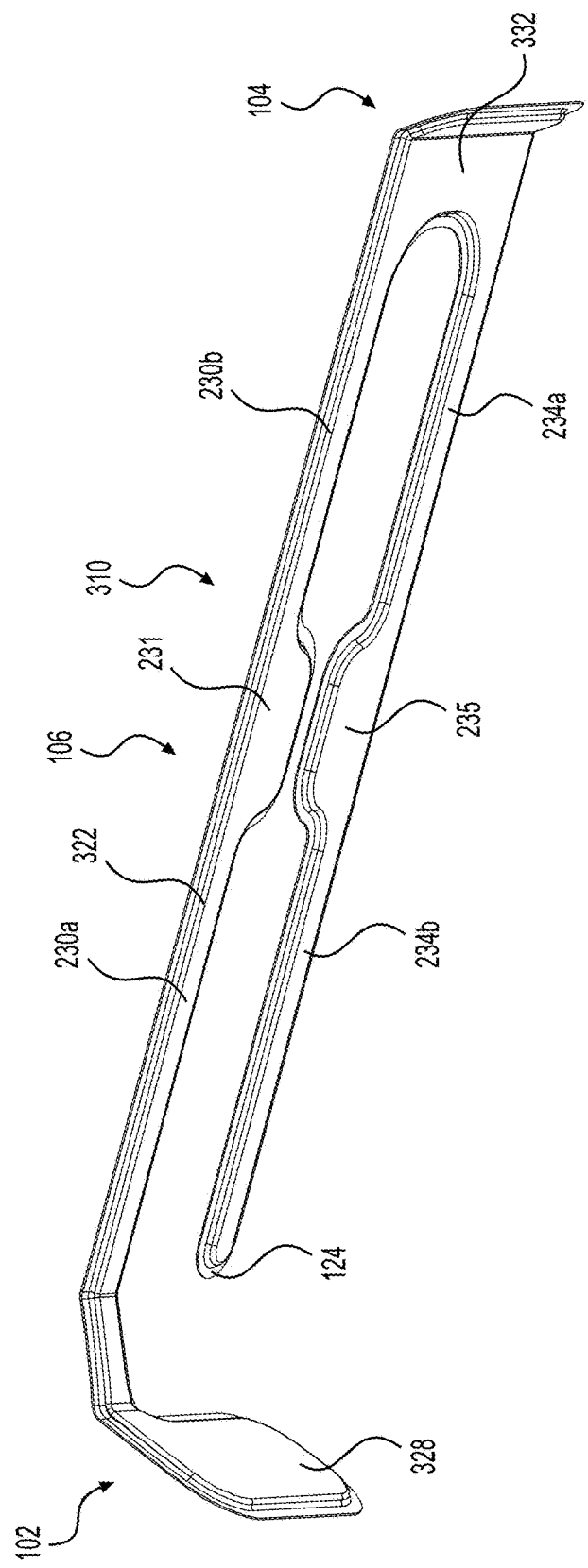
FIG. 20 is a perspective view taken from a bottom, rear, left side of a bottom part of a third implementation of a heat exchanger assembly of the snowmobile of FIG. 2.
Figure 21:
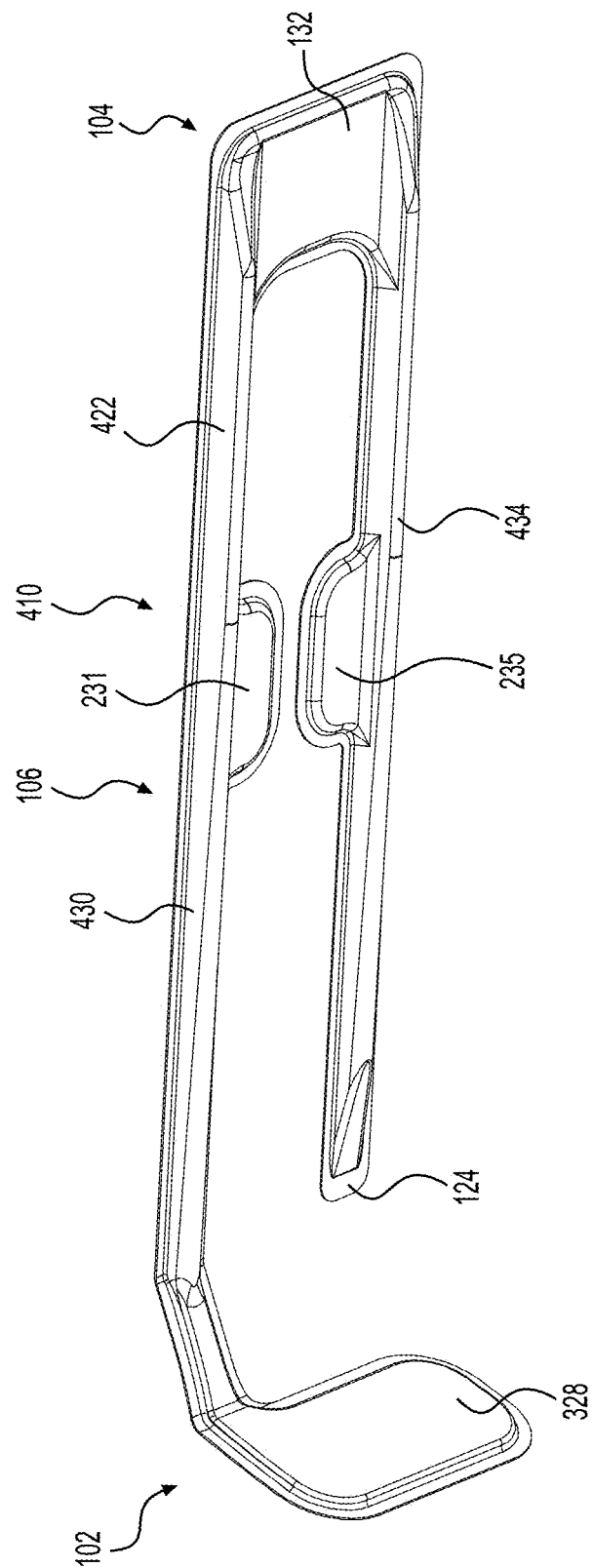
FIG. 21 is a perspective view taken from a bottom, rear, left side of a bottom part of a fourth implementation of a heat exchanger assembly of the snowmobile of FIG. 2.
Figure 24:
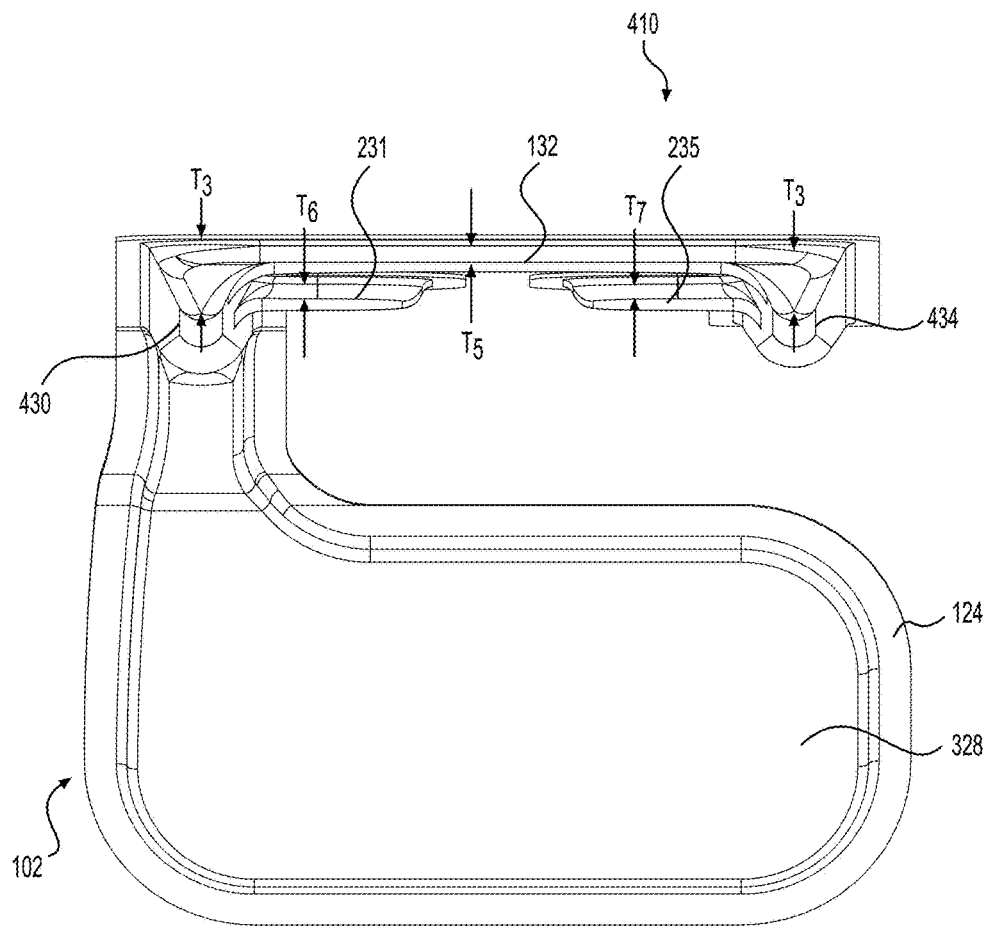
FIG. 24 is a rear elevation view of the bottom part of the heat exchanger assembly of FIG. 21.

Turning now to FIG. 20, the bottom part 310 of another implementation of a heat exchanger assembly will be described. It should be understood that although not shown, this other implementation of the heat exchanger assembly has a top part similar to the top parts described above, but shaped to match the lateral profile of the bottom part 310, and also has inlet and outlet pipes. The bottom part 310 defines a recess 322. A passage is formed between the recess 322 and the top part. The bottom portion 310 is similar to the bottom portion 210 described above except that the portion 228 of the passage of the heat exchanger assembly has been replaced by a portion 328 and the portion 132 has been replaced by a portion 332. The portion 328 is similar in shape to the portion 228 described above except that it has a uniform thickness. The portion 332 is similar in shape to the portion 132 except that it has a portion bent down (i.e. sharply curved down). Also, instead of being curved down as in the above implementations, the front portion 102 is bent down (i.e. sharply curved down) in two places.

Turning now to FIGS. 21 to 24, the bottom part 410 of another implementation of a heat exchanger assembly will be described. It should be understood that although not shown, this other implementation of the heat exchanger assembly has a top part similar to the top parts described above, but shaped to match the lateral profile of the bottom part 410, and also has inlet and outlet pipes. The bottom part 410 defines a recess 422. A passage is formed between the recess 422 and the top part. The bottom portion 410 is similar to the bottom portion 310 described above except that the portions 230A, 230B of the passage have been replaced by a portion 430 from which the portion 231 extends laterally and the portions 234A, 234B of the passage have been replaced by a portion 434 from which the portion 231 extends laterally. The portions 430, 434 of the passage are thicker than the portions 230A, 230B, 234A and 234B that they replace. The portions 430, 434 also have a thickness T3 (FIG. 22) that is greater than the thicknesses T4, T5, T6, T7 (FIGS. 22 and 24) of the portions 328, 132, 231 and 235 respectively.

Figure 25:
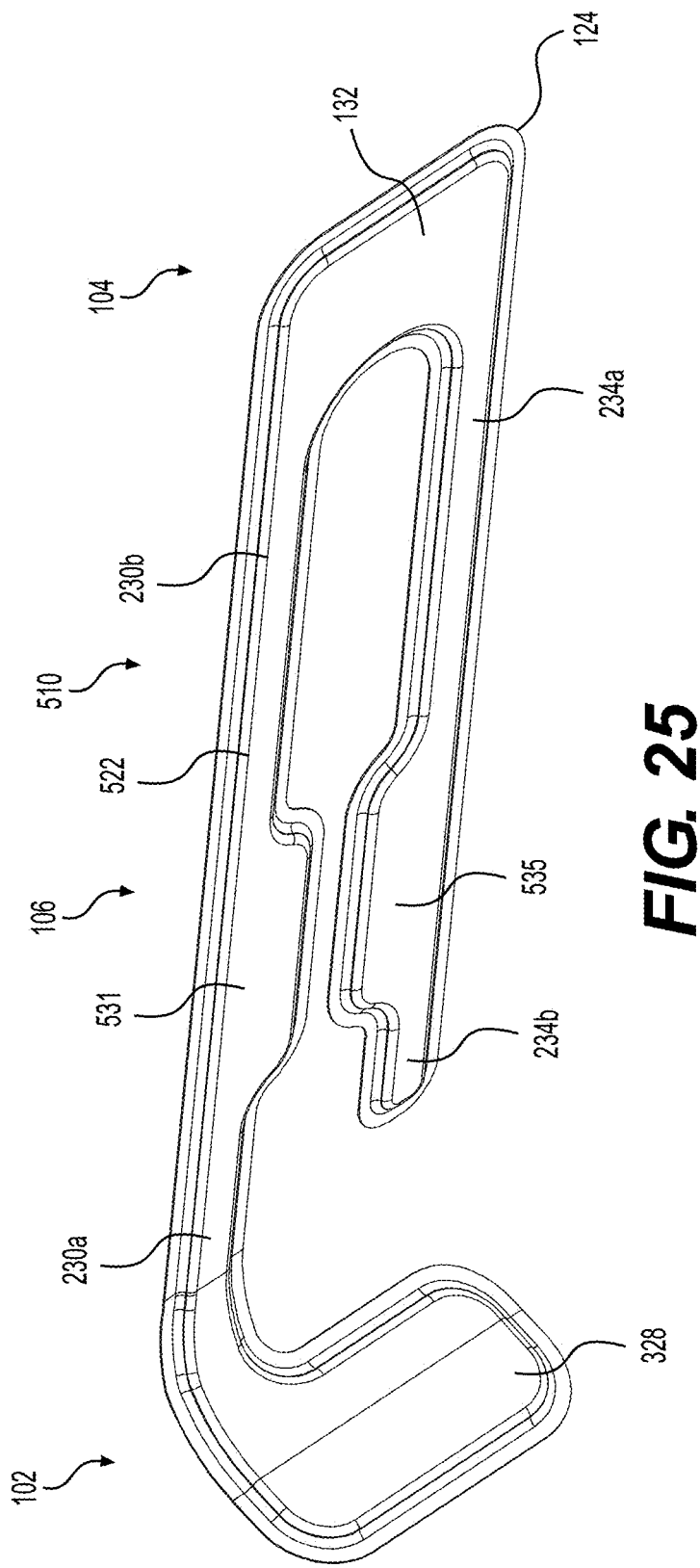
FIG. 25 is a perspective view taken from a bottom, rear, left side of a bottom part of a fifth implementation of a heat exchanger assembly of the snowmobile of FIG. 2.
Figure 26:
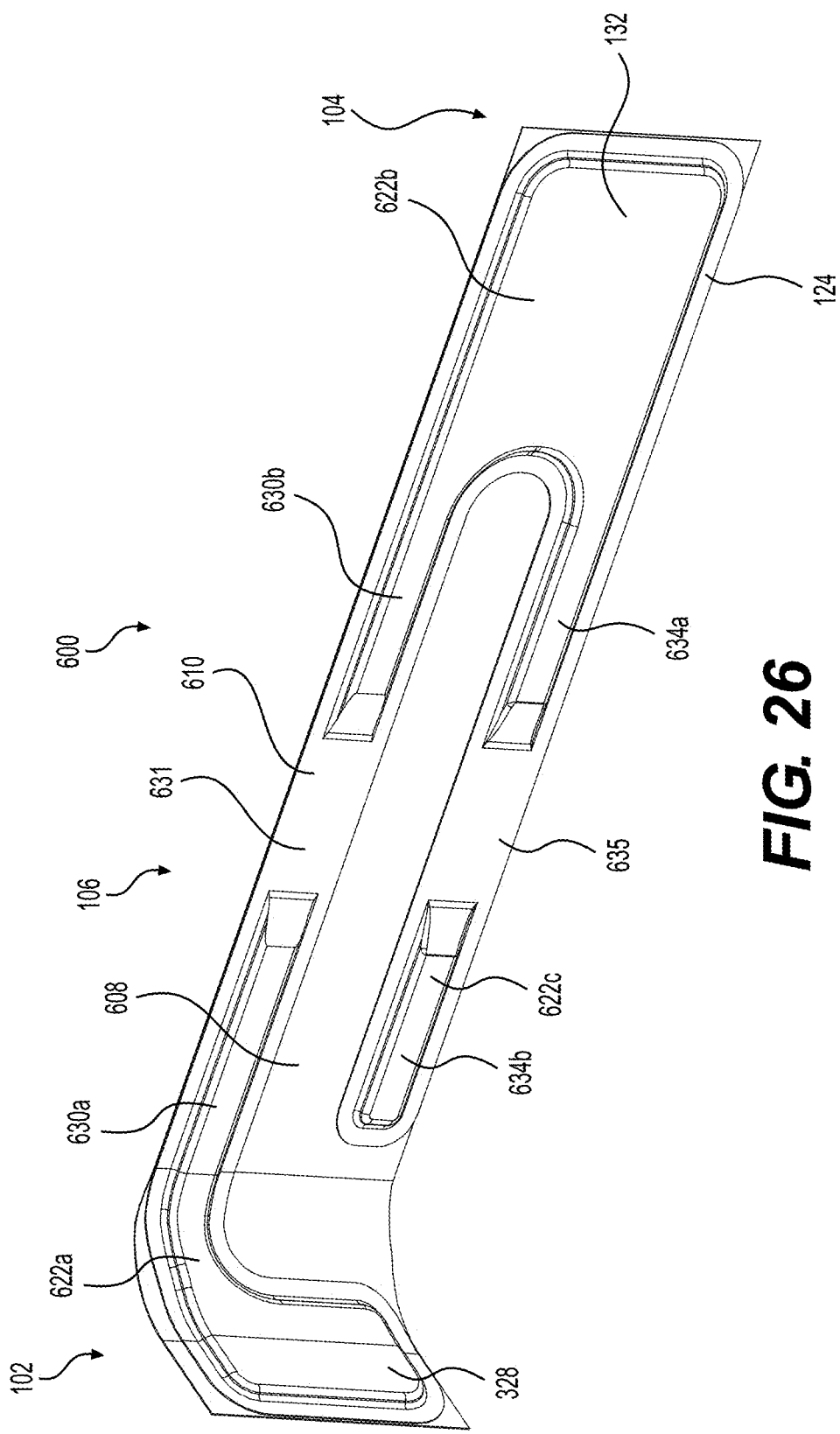
FIG. 26 is a perspective view taken from a bottom, rear, left side of a sixth implementation of a heat exchanger assembly of the snowmobile of FIG. 2.
Figure 27:
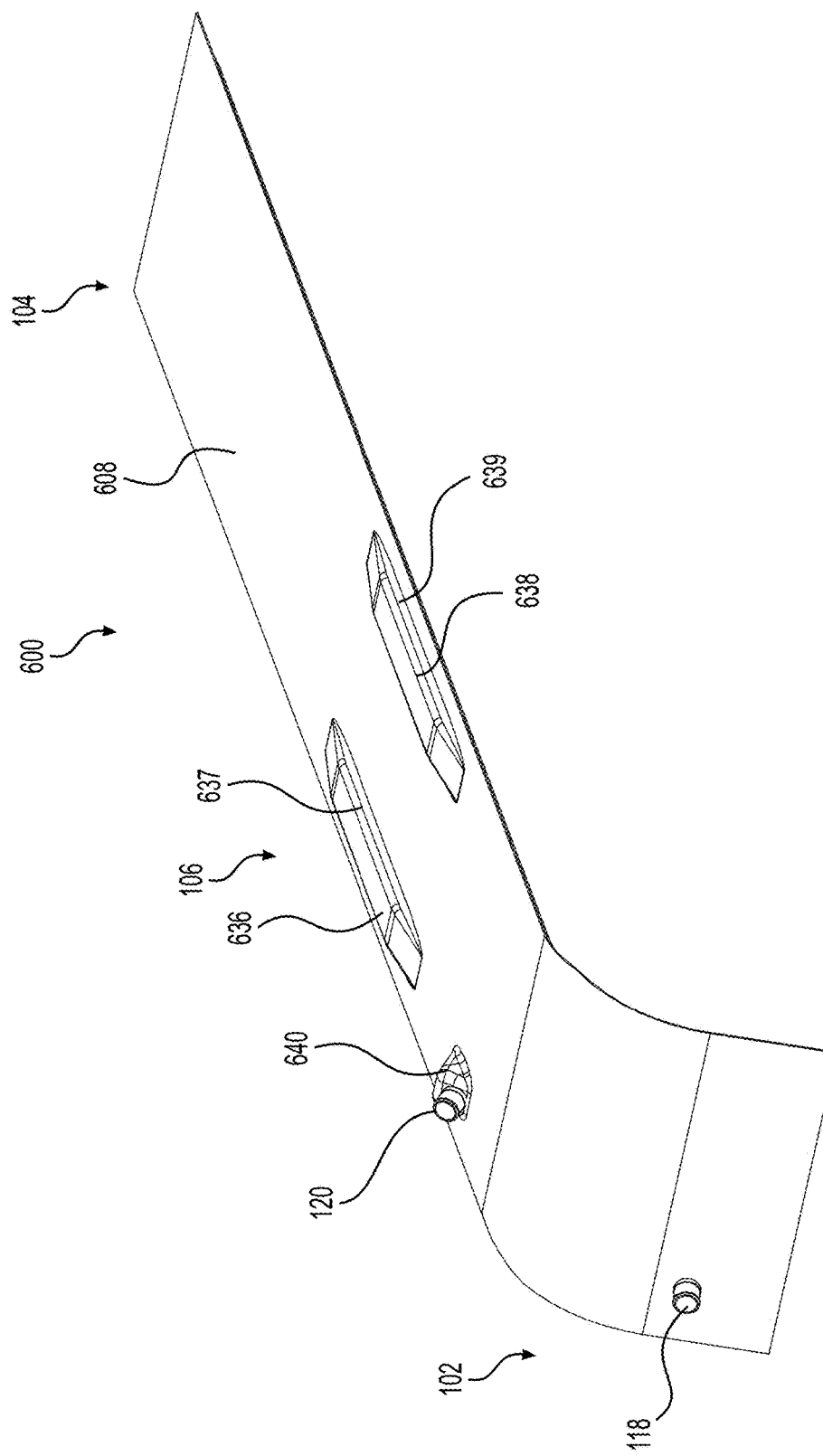
FIG. 27 is a perspective view taken from a top, front, left side of the heat exchanger assembly of FIG. 26.
Figure 28:
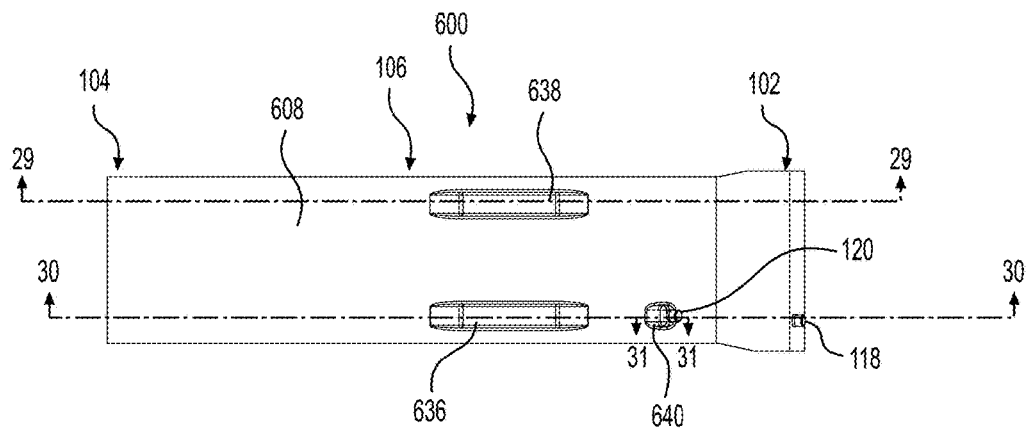
FIG. 28 is top plan view of the heat exchanger assembly of FIG. 26.

Turning now to FIG. 25, the bottom part 510 of another implementation of a heat exchanger assembly will be described. It should be understood that although not shown, this other implementation of the heat exchanger assembly has a top part similar to the top parts described above, but shaped to match the lateral profile of the bottom part 510, and also has inlet and outlet pipes. The bottom part 510 defines a recess 522. A passage is formed between the recess 522 and the top part. The bottom portion 510 is similar to the bottom portion 210 described above except that the portions 228, 231 and 235 of the passage have been replaced by portions 328, 531 and 535 respectively. The portions 531 and 535 are longer and disposed more forward along the middle portion 106 than the portions 231 and 235 of the heat exchanger assembly 200 in order to accommodate a different geometry of rear suspension assembly.

Figure 29:
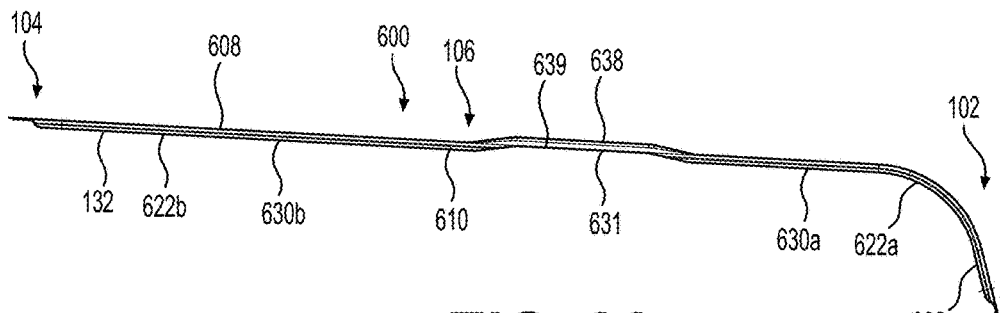
FIG. 29 is a cross-sectional view of the heat exchanger assembly of FIG. 26 taken through line 29-29 of FIG. 28.
Figure 30:
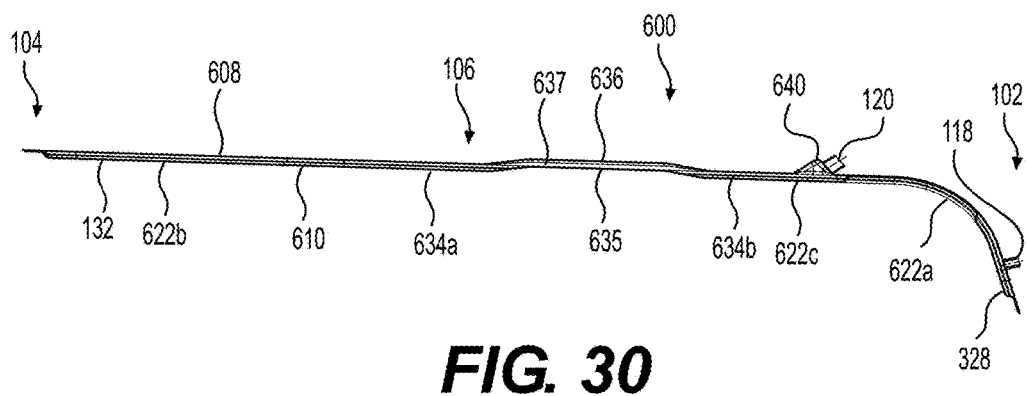
FIG. 30 is a cross-sectional view of the heat exchanger assembly of FIG. 26 taken through line 30-30 of FIG. 28.
Figure 31:
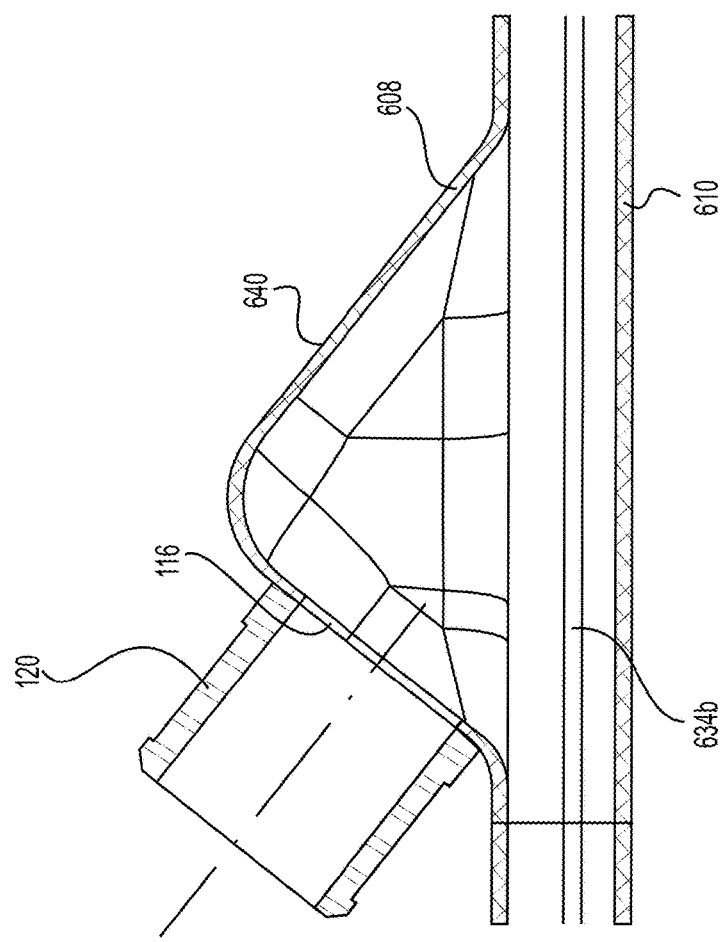
FIG. 31 is a cross-sectional view of a portion of the heat exchanger assembly of FIG. 26 taken through line 31-31 of FIG. 28.

Turning now to FIGS. 26 to 31, a heat exchanger assembly 600 will be described. The heat exchanger assembly 600 has a top part 608 joined to a bottom part 610 to form a passage therebetween. The top part 608 is similar in shape to the top part 210 but is stamped to form two long and narrow recesses 636, 638. As best seen in FIG. 31, a protrusion 640 having a generally triangular cross-section is also stamped in the top part 608. The aperture forming the inlet 116 is formed in the front angled side of the protrusion 640. It is contemplated that the protrusion 640 could have other shapes. For example, it is contemplated that the protrusion 640 could be generally hemispheric, thus permitting the inlet 116 to be formed in almost any desired orientation. The inlet pipe 120 is welded to this surface around the inlet 116. As a result, the inlet pipe 120 is disposed at an angle to the middle portion 106, but since the inlet pipe 120 is perpendicular to the front surface of the protrusion 640, welding the inlet pipe 120 to the top part 608 is more easily accomplished than if there were no protrusion 640. It is contemplated that protrusions similar to the protrusion 640 could be provided for welding the outlet and inlet pipes 118, 120 of the various implementations of heat exchanger assemblies described herein.

The bottom part 610 is curved at its front to match the curvature of the top part 608. The bottom part 610 is stamped to form three recesses 622A, 622B and 622C. The recess 622A and the top part 608 form a front passage portion 328 and a long and narrow passage portion 630A. The recess 622B and the top part 608 form a long and narrow passage portion 630B, a rear passage portion 132 and a long and narrow passage portion 634A. The recess 622C and the top part 608 form a long and narrow passage portion 634B.

The recess 638 in the top part 608 and the flat portion 631 of the bottom part 610 between the passage portions 630A and 630B form a passage portion 639. As best seen in FIG. 29, the passage portion 639 communicates with the passage portion 630A at its front and with the passage portion 630B at its rear. The recess 636 in the top part 608 and the flat portion 635 of the bottom part 610 between the passage portions 634A and 634B form a passage portion 637. As best seen in FIG. 30, the passage portion 637 communicates with the passage portion 634B at its front and with the passage portion 634A at its rear.

During operation of the engine 26, coolant enters the heat exchanger assembly 600 via the inlet pipe 120 and the inlet 116. The coolant then flows consecutively through the passage portions 634B, 637, 634A, 132, 630B, 639, 630A and 328. From the portion 328 of the passage, the coolant then flows through the outlet 114 and the outlet pipe 118 to be returned to the engine 26.

Figure 32:
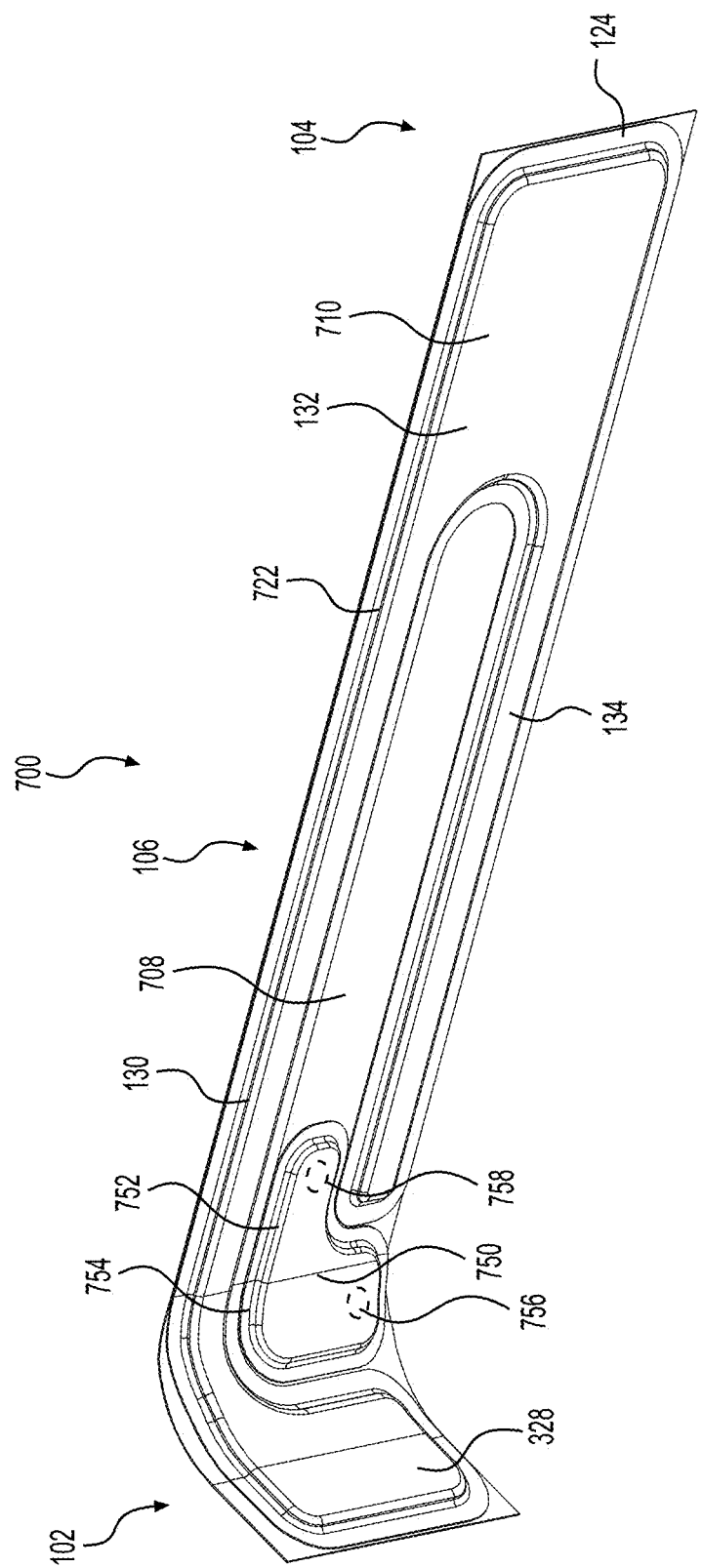
FIG. 32 is a perspective view taken from a bottom, rear, left side of a seventh implementation of a heat exchanger assembly of the snowmobile of FIG. 2.

Turning now to FIGS. 32 and 33, a heat exchanger assembly 700 will be described. The heat exchanger assembly 700 has a top part 708 joined to a bottom part 710 to form a passage therebetween and another bottom part 750 joined to the top part 708 to form another passage therebetween.

The bottom part 710 is stamped to form a recess 722 to define the passage between the bottom part 710 and the top part 708. The passage formed by the bottom part 710 is similar to the passage formed in the heat exchanger assembly 100 except that the portions 126, 128 have been replaced by a portion 328.

The bottom part 750 is stamped to form a recess 752 with a border 754 around it. The border 754 is used to weld or otherwise join the bottom part 750 to the bottom of the top part 708. As can be seen, the recess 752 is generally L-shaped and extends in part along the front portion 102 and in part along the middle portion 106. As a result, the recess 752 is also curved to follow the curvature of the top part 708. Since the recess 752 and the top part 708 define a shape of the passage, the passage formed by the recess 752 is generally L-shaped and, has seen from a lateral side of the heat exchanger assembly 700, is curved. In this position, the passage formed by the bottom part 750 can be cooled by snow projected by the drive track 30 during operation of the snowmobile 10. The passage portion 328 extends laterally along a front of the passage formed by the bottom part 750. The passage portion 130 extends longitudinally along a left side of the passage formed by the bottom part 750. The rear portion of the passage formed by the bottom part 750 is disposed laterally between the passage portions 130 and 134. It is contemplated that instead of or in addition to the bottom part 750, another passage could be formed by another part having a recess that is joined to a top of the top part 708.

The top portion 708 is shape like the top portion 108 of the heat exchanger 100 but has two apertures formed therein to form the inlet 756 and the outlet 758 (shown in dotted lines in FIG. 32) of the passage formed by the bottom part 750. As can be seen in FIG. 33, an inlet pipe 760 is welded or otherwise joined to the top part 708 around the inlet 756 and an outlet pipe 762 is welded or otherwise joined to the top part 708 around the outlet 758.

The passage formed by the bottom part 750 is fluidly separate from the passage formed by the bottom part 710. As such, the passage formed by the bottom part 750 is used to cool a motor fluid other than the engine coolant such as oil used to lubricate the engine 26 or air to be supplied to the engine 26 by having this other motor fluid flowing through this other passage.

Figure 35:
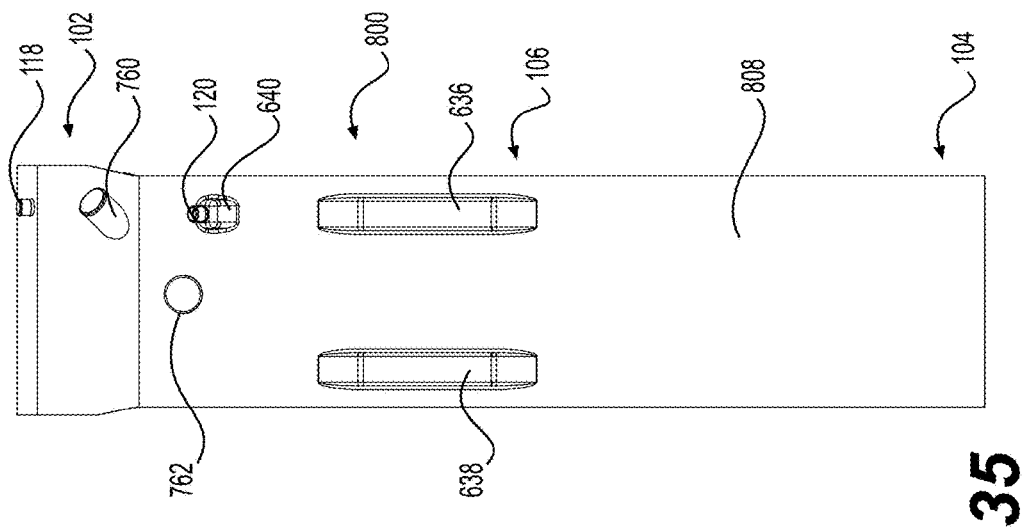
FIG. 35 is a top plan view of the heat exchanger assembly of FIG. 34.
Figure 34:
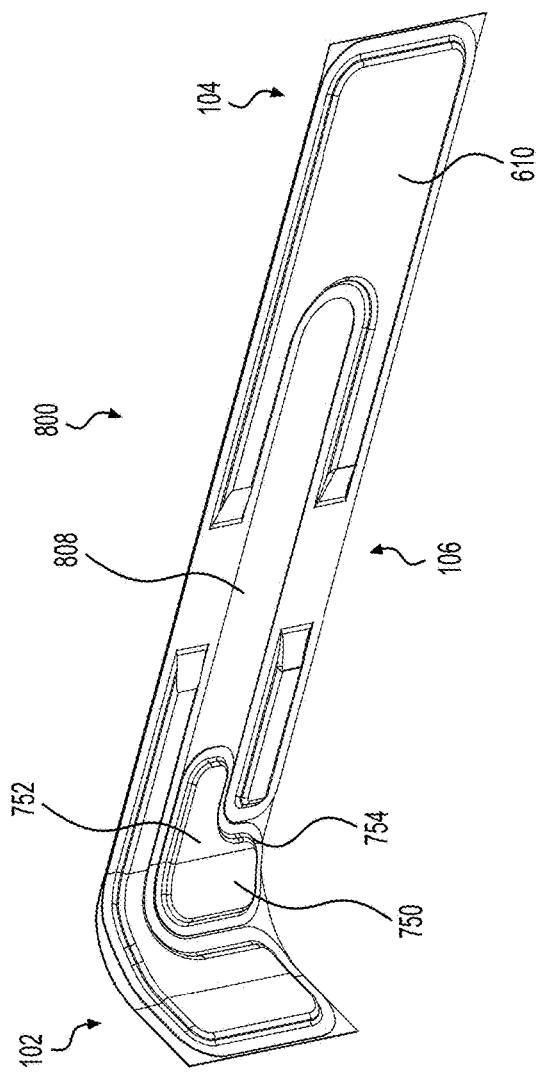
FIG. 34 is a perspective view taken from a bottom, rear, left side of a eighth implementation of a heat exchanger assembly of the snowmobile of FIG. 2.

Turning now to FIGS. 34 and 35, a heat exchanger assembly 800 will be described. The heat exchanger assembly 800 has a top part 808 joined to the bottom part 610 described above to form a first passage therebetween and the bottom part 750 described above joined to the top part 808 to form a second passage therebetween. As such, the heat exchanger assembly 800 can also be used to cool two different motor fluids. The top part 808 is similar to the top part 608 described above, but has the apertures forming the inlet 756 and the outlet 758 of the second passage. The inlet and outlet pipes 760, 762 are welded or otherwise joined to the top part 808 around the inlet 756 and outlet 758 respectively.

Figure 36:
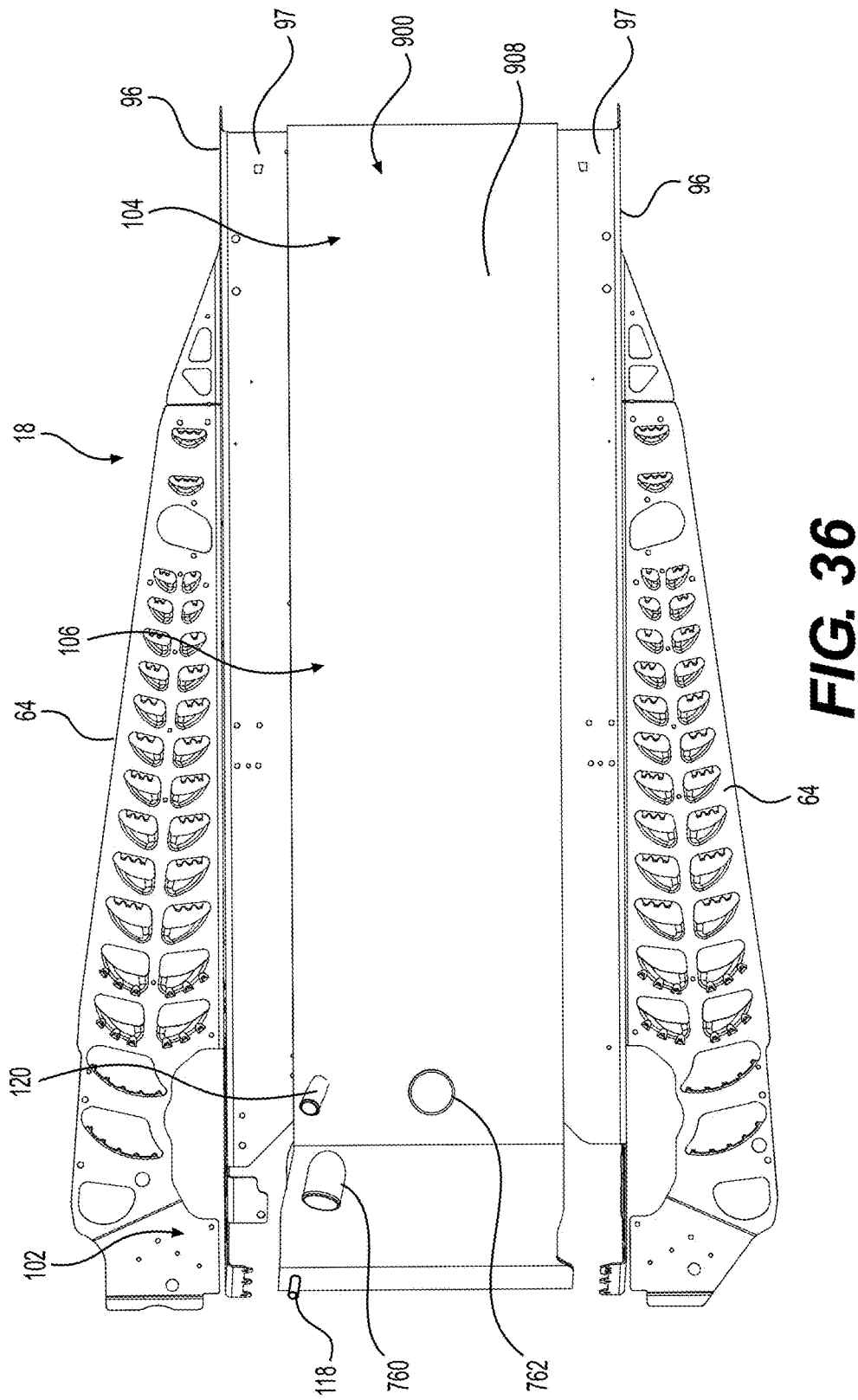
FIG. 36 is a top plan view of a tunnel of the snowmobile of FIG. 2 having an ninth implementation of a heat exchanger assembly.
Figure 37:
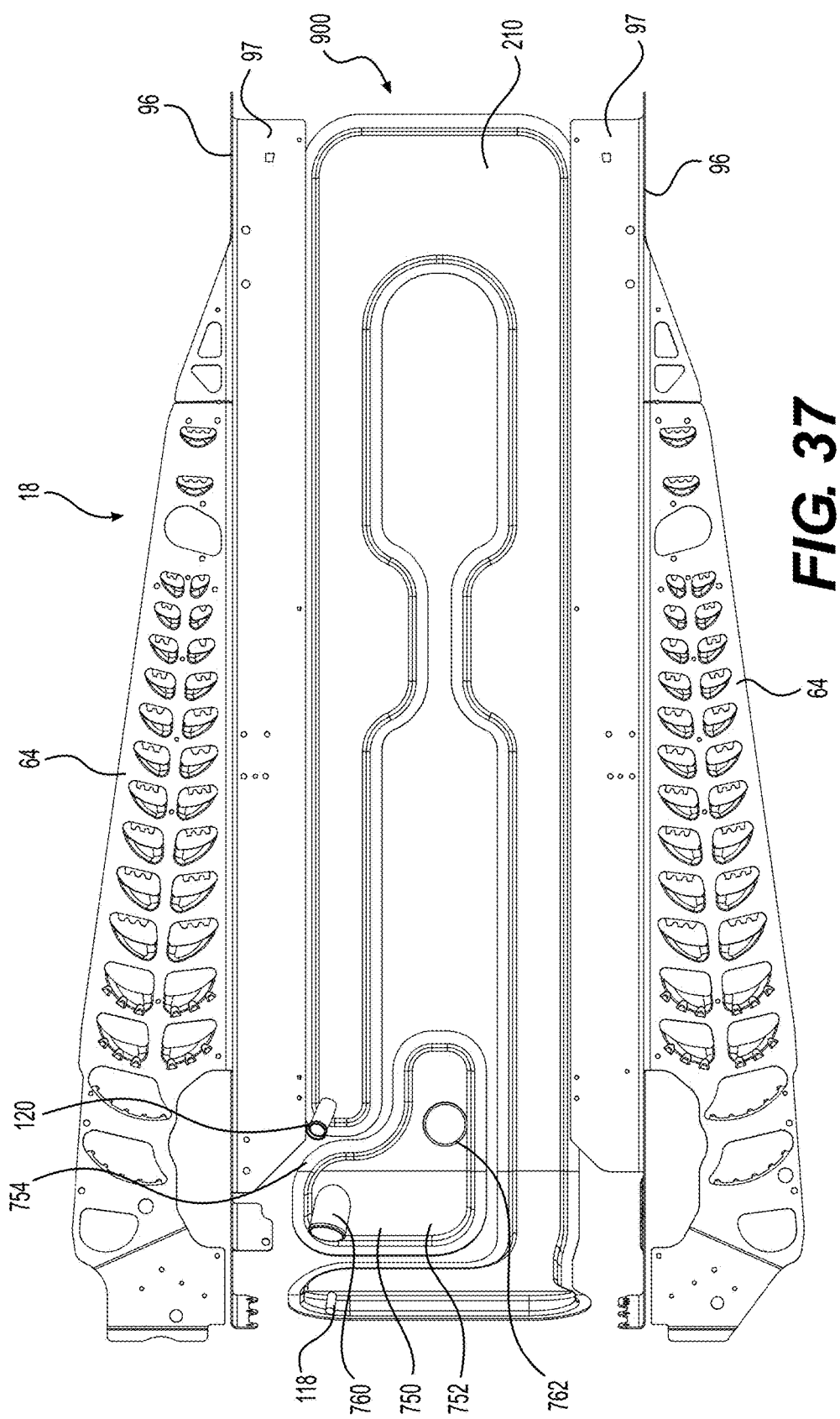
FIG. 37 is a top plan view of the tunnel of the snowmobile of FIG. 2 and the ninth implementation of the heat exchanger assembly with a top part of the heat exchanger assembly removed.
Figure 38:
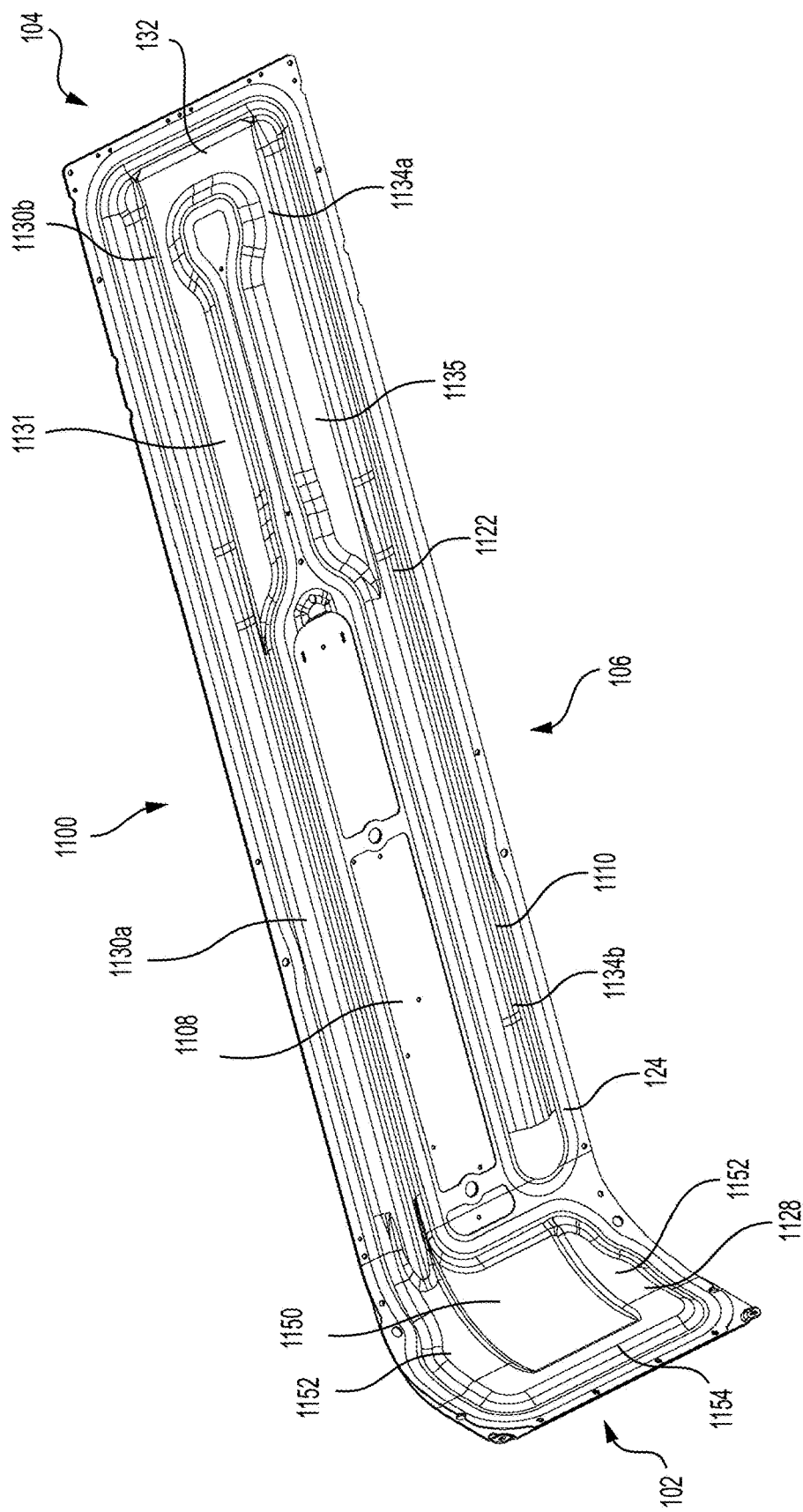
FIG. 38 is a perspective view taken from a bottom, rear, left side of a tenth implementation of a heat exchanger assembly of the snowmobile of FIG. 2.

Turning now to FIGS. 36 and 37, a heat exchanger assembly 900 will be described. The heat exchanger assembly 900 has a top part 908 joined to the bottom part 210 described above to form a first passage therebetween and the bottom part 750 described above joined to the top part 908 to form a second passage therebetween. As such, the heat exchanger assembly 900 can also be used to cool two different motor fluids. The top part 908 is similar to the top part 208 described above, but has the apertures forming the inlet 756 and outlet 758 of the second passage. The inlet and outlet pipes 760, 762 are welded or otherwise joined to the top part 908 around the inlet 756 and outlet 758 respectively.

Although the heat exchanger assemblies described above are designed to take advantage of the snow projected by the drive track 30 of the snowmobile 10 during operation of the snowmobile 10, it should be understood that the air around the heat exchanger assemblies also cools the motor fluid(s) flowing through the heat exchanger assemblies. It is contemplated that fins or other types of heat sinks could be attached to at least some of the surfaces of the heat exchanger assemblies forming the passage(s) described above to further increase cooling of the motor fluid(s) flowing through the passage(s).

A method of manufacturing the heat exchanger assembly 100 will now be described. A similar method is used to manufacture the other heat exchangers described above.

A first part of sheet metal, such as aluminum, is cut to a desired shape in order to make the top part 108. A front portion of the first part of sheet metal is curved from a middle portion of the first part of sheet metal using a press or other suitable machine to form the top part 108. The apertures 112, the outlet 114 and the inlet 116 are then cut or drilled into the top part 108. The apertures 112, the outlet 114 and the inlet 116 could also be stamped out of the top part 108 using a press. The outlet pipe 118 and the inlet pipe 120 are then welded or otherwise connected to the top part 108 around the outlet 114 and the inlet 116 respectively.

A second part of sheet metal, such as aluminum, is cut to a desired shape in order to make the bottom part 110. In one implementation, the first and second parts of sheet metal have the same initial thickness. A front portion of the second part of sheet metal is curved from a middle portion of the second part of sheet metal using a press or other suitable machine such that a curvature of the second part of sheet metal corresponds to a curvature of the top part 108. Then, using a press, the recess 122 is stamped in the second part of sheet metal thereby forming the bottom part 110. This stamping also forms the border 124.

The top part 108 is then joined to the bottom part 110 thereby forming the passage between the recess 122 and the top part 108. In the present implementation, the top part 108 is welded to the border 124 of the bottom part 110, such as by friction stir welding. However it is contemplated that the top part 108 could be joined to the bottom part 110 in other manners such as by brazing, bonding or fastening for example. If fasteners are used, it is contemplated that a seal could be disposed between the border 124 and the top part 110 to prevent the motor fluid to leak out of the passage.

It is contemplated that the top part 108 and the bottom part 110 could be made of other types of thin walled material. It is also contemplated that at least the bottom part 110 could be molded, in which case the recess 122 and border 124 would be formed in the mold.

To make a top part having recesses and protrusions such as the top part 608, these are stamped in the sheet metal in a manner similar to which the recess 122 is formed in the bottom part 110. The part 750 is formed in a manner similar to the one used to make the bottom part 110 and is joined to its corresponding top part in a similar manner.

Turning now to FIGS. 38 to 45, a heat exchanger assembly 1100 will be described. The heat exchanger assembly 1100 has a top part 1108 and a bottom part 1110. The bottom part 1110 defines a recess 1122. A passage is formed between the recess 1122 and the top part 1108. In the heat exchanger assembly 1100, the portion 228 of the passage of the heat exchanger assembly 200 has been replaced by a portion 1128. The portion 1128 will be described in greater detail below.

Figure 39:
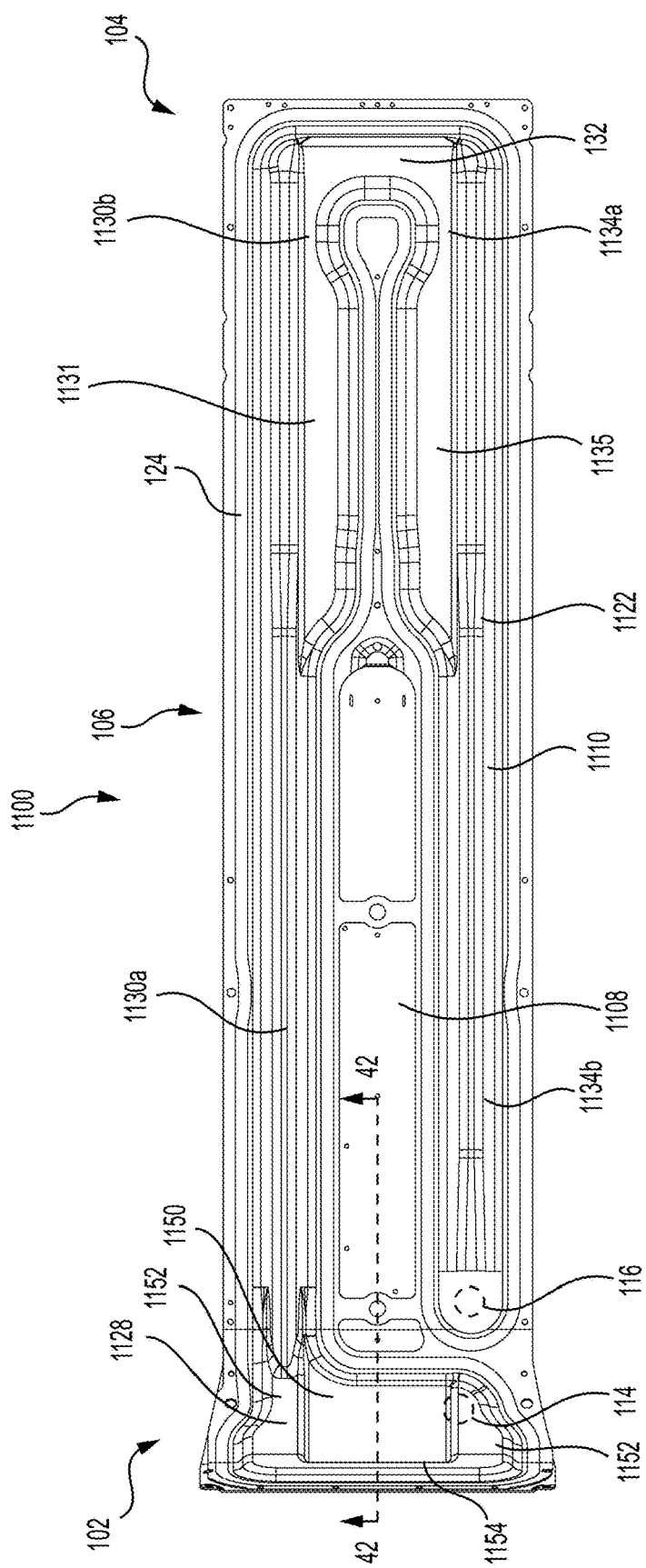
FIG. 39 is a bottom plan view of the heat exchanger assembly of FIG. 38.

In the heat exchanger assembly 1100, the portion 134 of the passage of the heat exchanger assembly 100 has been replaced by a short narrow portion 1134A, a long narrow portion 1134B and a wide portion 1135 between the portions 1134A, 1134B. As best seen in FIG. 39, the portion 1135 is wider than the portions 1134A and 1134B, but narrower than the portion 132. Coolant flows from the inlet 116 (shown in dotted lines in FIG. 39) to the portion 1134B, to the portion 1135, then to the portion 1134A and then to the portion 132.

In the heat exchanger assembly 1100, the portion 130 of the passage of the heat exchanger assembly 100 has been replaced by a long narrow portion 1130A, a short narrow portion 230B and a wide portion 1131 between the portions 1130A, 1130B. As best seen in FIG. 39, the portion 1131 is wider than the portions 1130A and 1130B, but narrower than the portion 132. Coolant flows from the portion 132 to the portion 1130B, to the portion 1131, then to the portion 1130A and then to the portion 1128.

The wider portions 1131 and 1135 of the passage of the heat exchanger assembly 1100 are disposed in the rear half of the heat exchanger assembly 1100. Making the portions 1131 and 1135 wide increases the amount of cooling obtained from snow projected thereon since a large surface is exposed to the projected snow.

Figure 40:
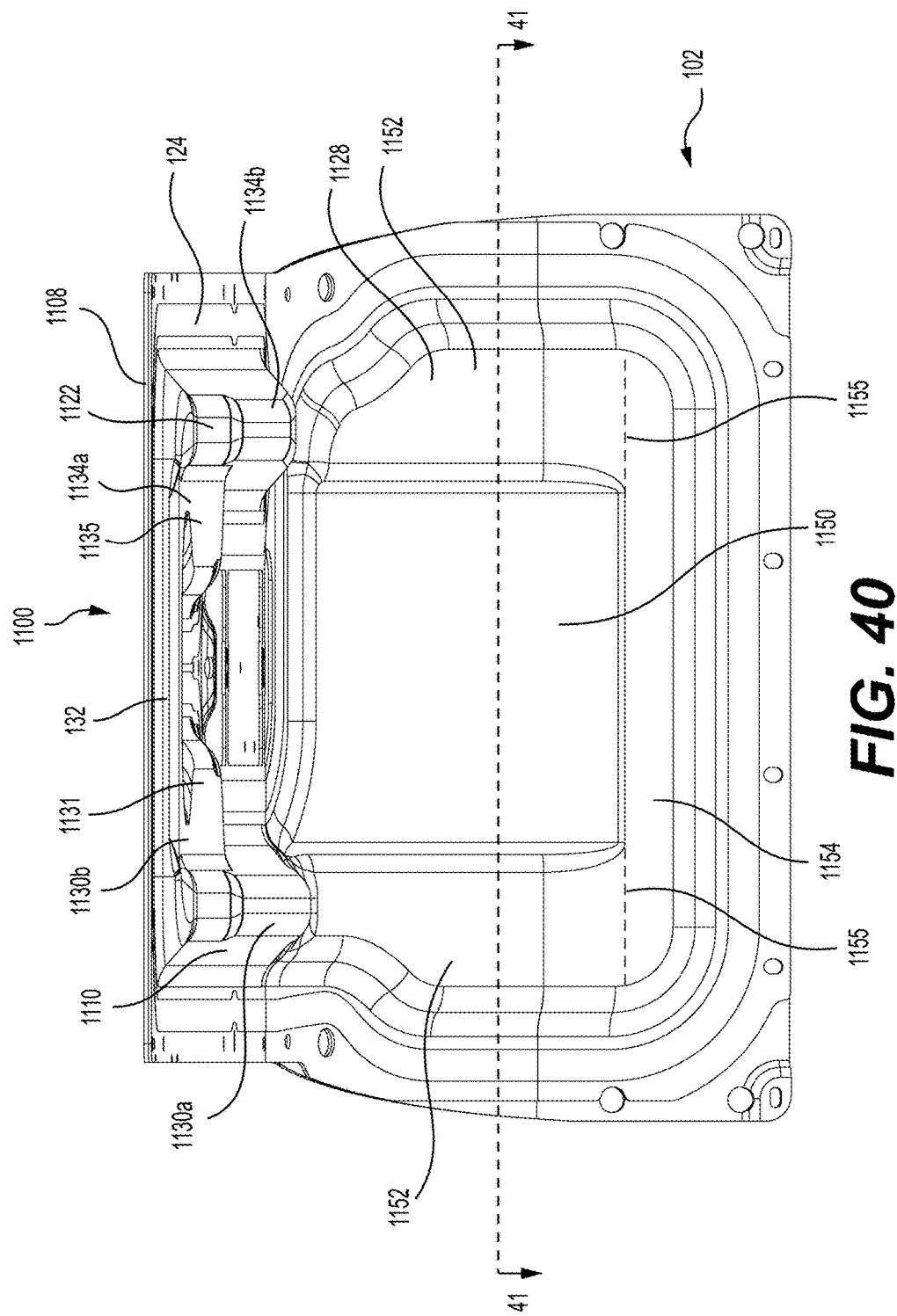
FIG. 40 is a rear elevation view of the heat exchanger assembly of FIG. 38.
Figure 41:
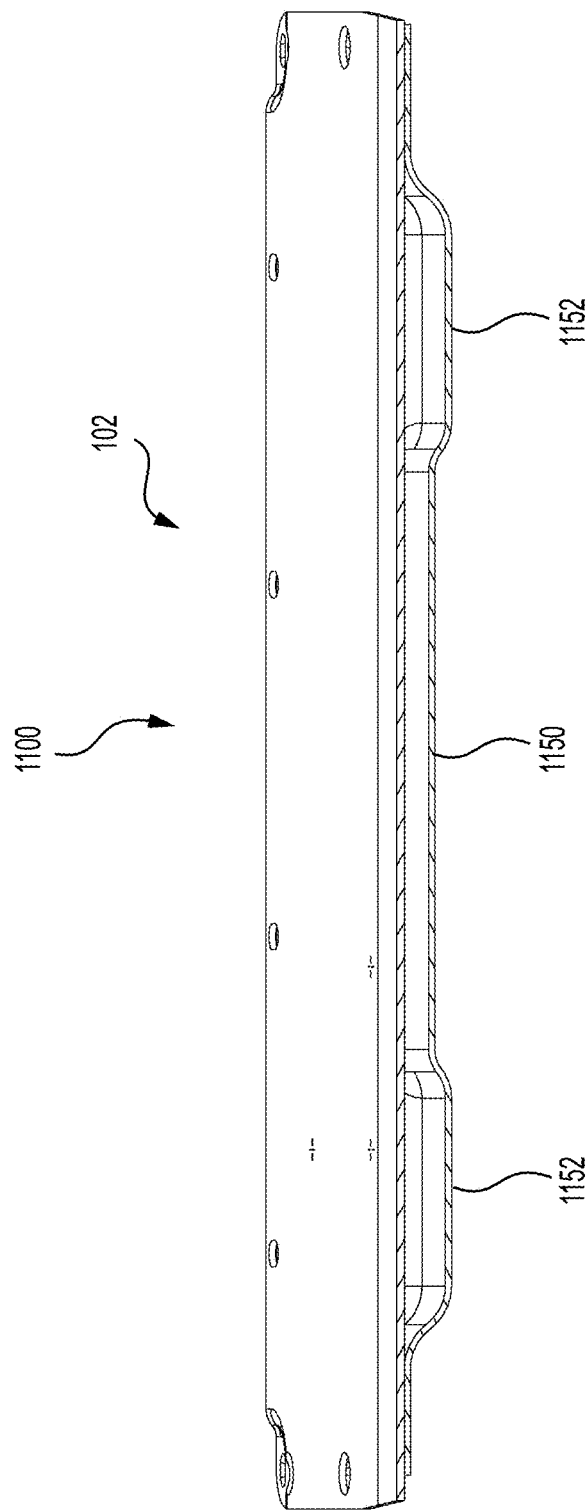
FIG. 41 is a cross-sectional view of the heat exchanger assembly of FIG. 38 taken through line 41-41 of FIG. 40.
Figure 42:
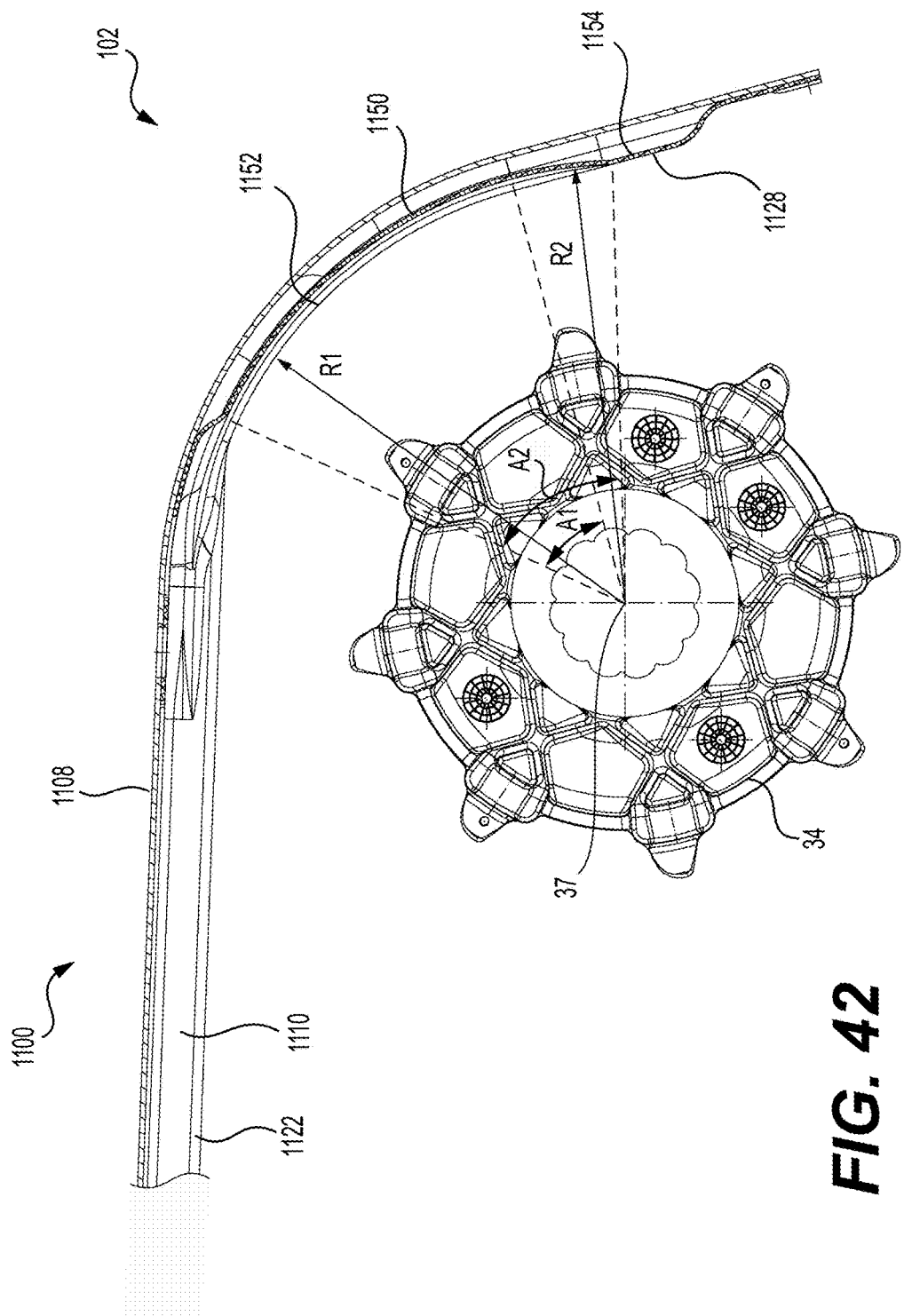
FIG. 42 is a cross-sectional view of the heat exchanger assembly of FIG. 38 taken through line 42-42 of FIG. 39 with a drive sprocket of the snowmobile of FIG. 2.

With reference to FIGS. 40 to 42, the portion 1128 of the heat exchanger assembly 1100 will be described in more detail. The portion 1128 has a central channel 1150 defined on an outer surface thereof. The central channel 1150 is laterally between two side sections 1152 and above a bottom section 1154 of the portion 1128.

The side sections 1152 each have an arcuate part spanning an angle A1 at a radius R1 from the sprocket axis 37 (see FIG. 42) followed by a straight part up to the bottom section 1154 (as indicated by dotted lines 1155 in FIG. 40). The straight parts of the side sections 1152 are parallel to the top part 1108. The central channel 1150 defines an arcuate surface spanning an angle A2 at a radius R2 from the sprocket axis 37 (see FIG. 42) up to the bottom section 1154. The angle A1 is less than the angle A2. The radius R2 is less than the radius R1. As such the thickness of the passage between the central channel 1150 and the top part 1108 is less than the thickness of the passage between the side sections 1152 and the top part 1108. The main surface to the bottom section 1154 is parallel to the top part 1108. The thickness of the passage between the side sections 1152 and the top part 1108 is the same as the thickness of the passage between the bottom section 1154 and the top part 1108.

Figure 43:
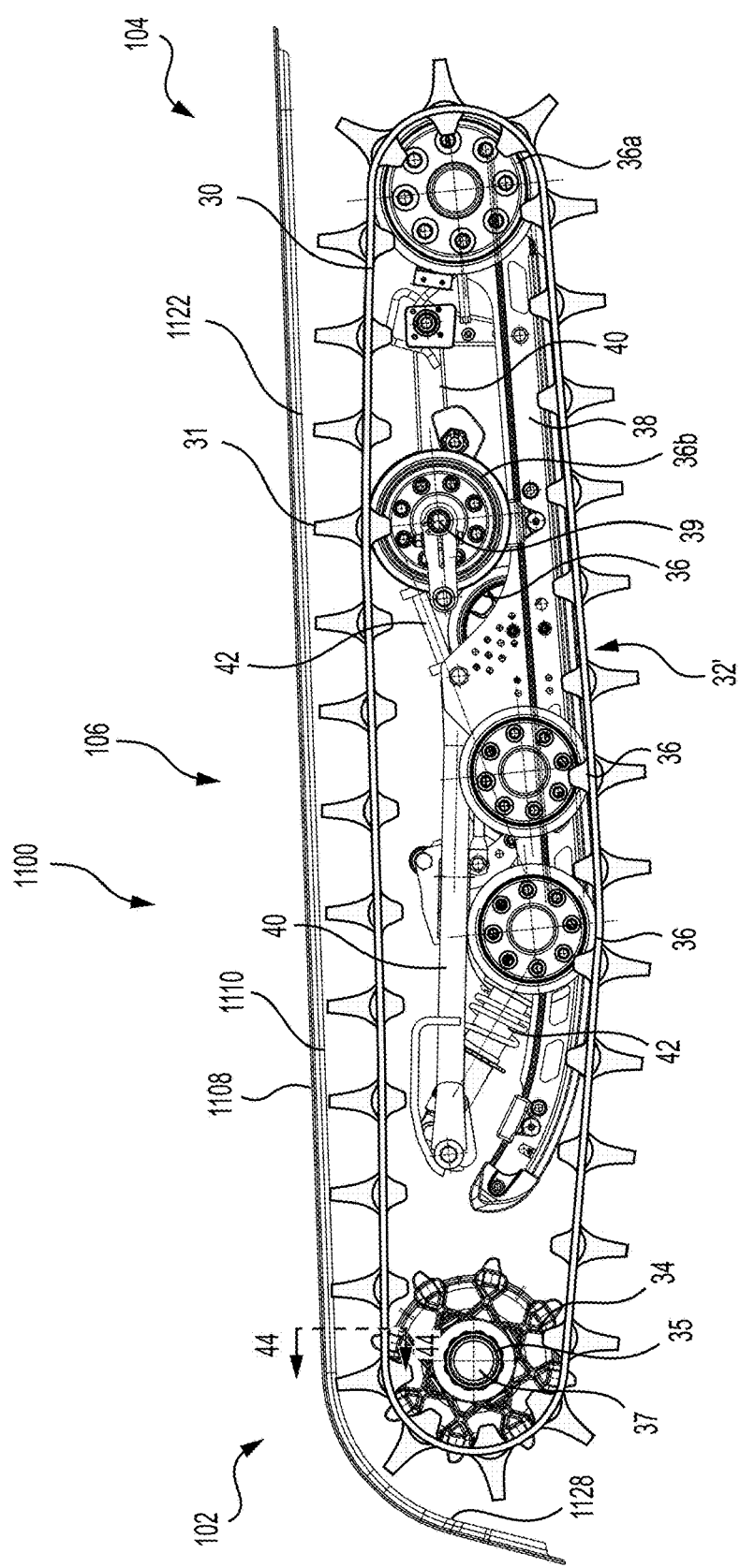
FIG. 43 is a left side elevation view of the suspension assembly of FIG. 17 in a compressed configuration, the drive sprocket and the drive track of the snowmobile of FIG. 2, and the heat exchanger assembly of FIG. 38.
Figure 44:
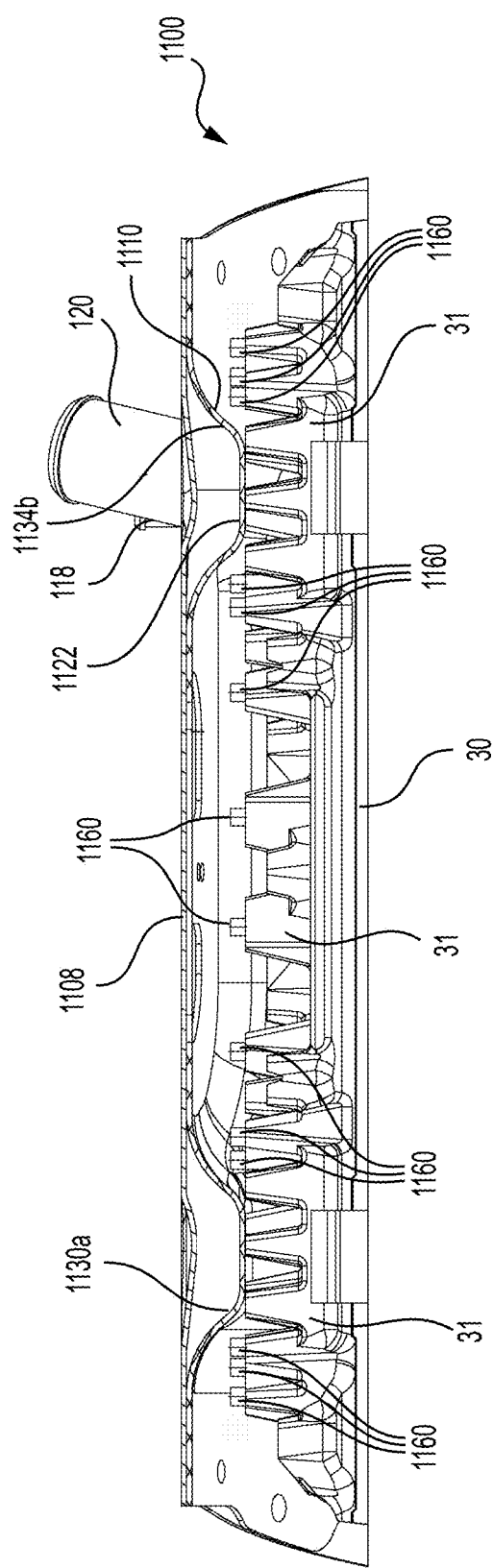
FIG. 44 is a cross-sectional view of the components of FIG. 43 taken through line 44-44 of FIG. 43.
Figure 45:
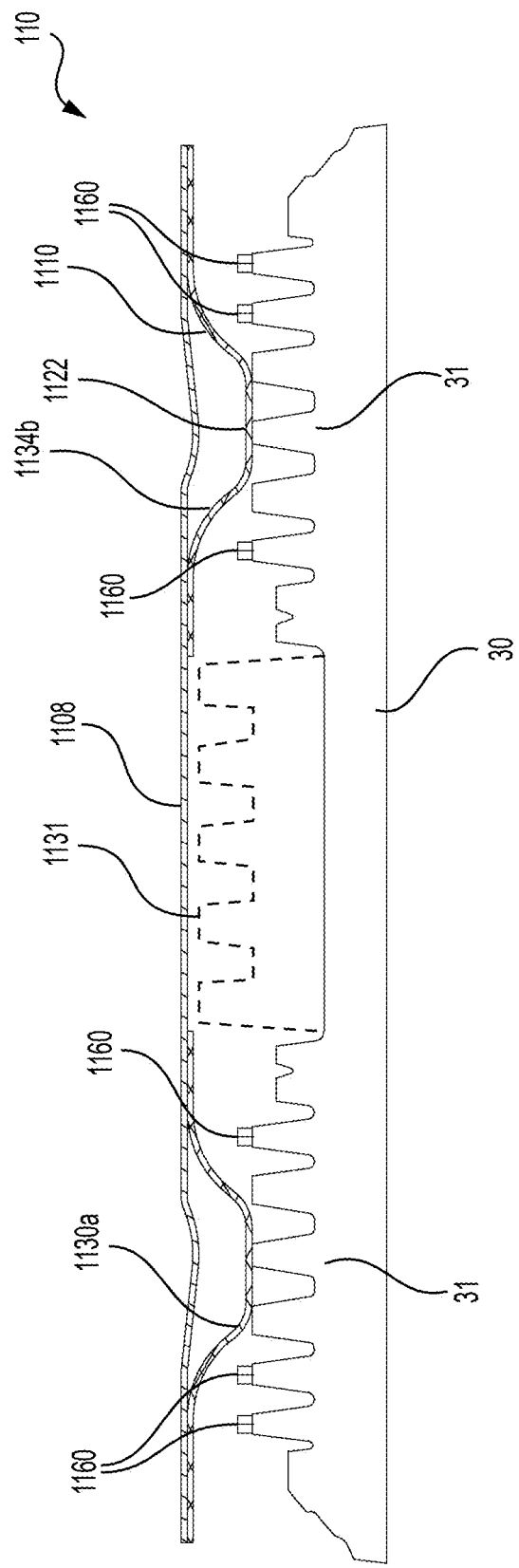
FIG. 45 is a slice of the components of FIG. 43 taken through line 44-44 of FIG. 43.

With reference to FIGS. 44 and 45, in the present implementation, the lugs 31 of the endless drive track 30 are provided with studs 1160 to improve traction. It will be noted that the portions of the lugs 31 that are laterally aligned with the portions 1130A and 1134B of the passage of the heat exchanger assembly 1100 are free of studs 1160. When the rear suspension assembly 32' is compressed as shown in FIGS. 43 to 45, and in other positions of the rear suspension assembly 32' (not shown), the portions of the lugs 31 that are laterally aligned with the portions 1130A and 1134B come into contact with the portions 1130A, 1134B, thus preventing the studs 1160 located to the left and right of the portions 1130A, 1134B from coming into contact with the bottom of the heat exchanger assembly 1100. It is contemplated that portions of the heat exchanger assemblies previously described above with respect to FIGS. 4 to 37 could similarly prevent studs 1160 provided on the lugs 31 of the endless drive track 30 from coming into contact with a bottom surface thereof.

As the central channel 1150 of the portion 1128 of the heat exchanger assembly 110 is disposed further from the drive sprocket 34 than the side sections 1152, the portions of the lugs 31 that are laterally aligned with the central channel 1150 can be provided with studs that are longer than the studs 1160 shown in FIGS. 44 and 45. Alternatively, the portion of the endless drive track 30 that is laterally aligned with the central channel 1150 can be provided with lugs 1131 (shown in dotted lines in FIG. 45) that are longer than the lugs 31.

Figure 46:
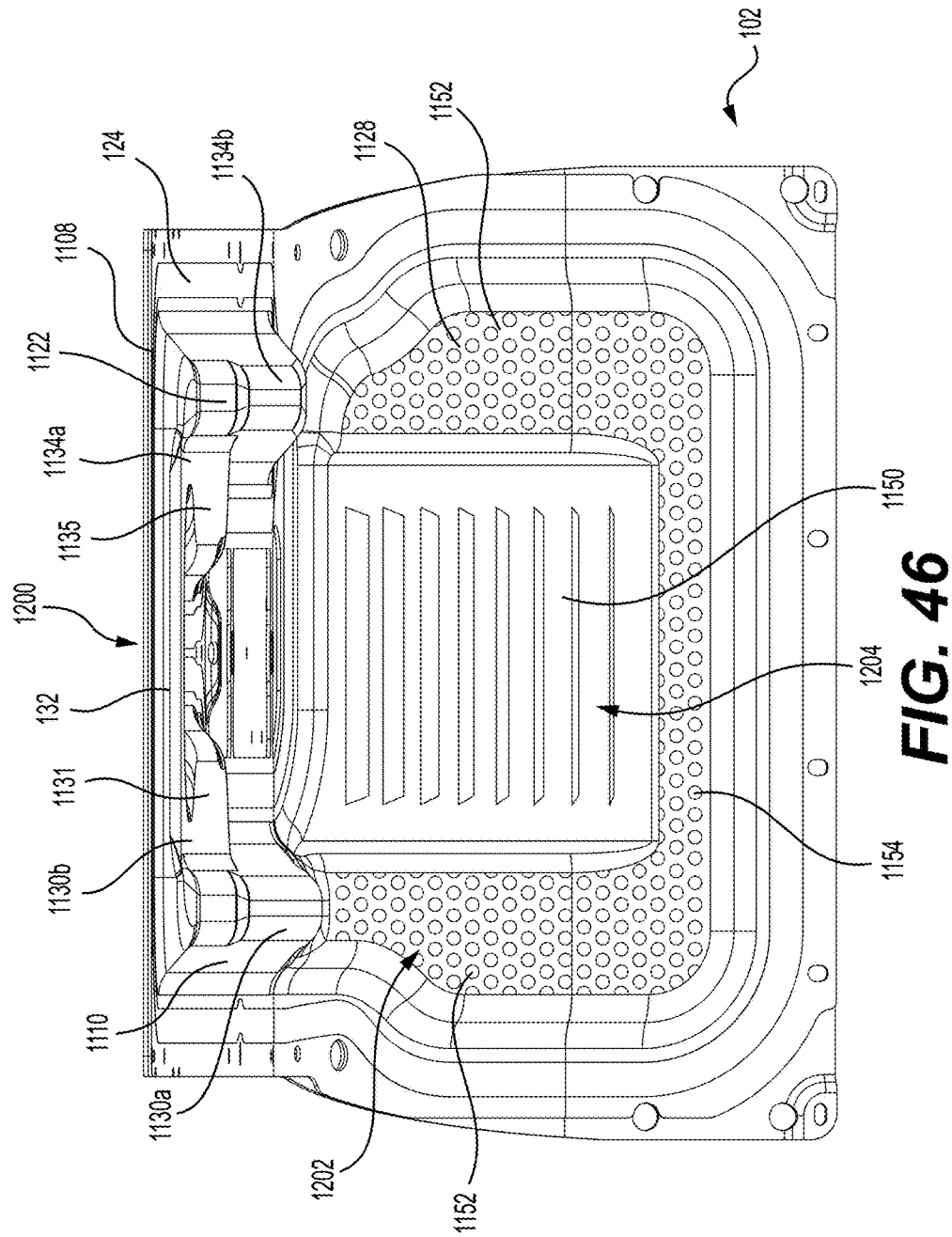
FIG. 46 is a rear elevation view of an eleventh implementation of a heat exchanger assembly of the snowmobile of FIG. 2.

Turning now to FIG. 46, a heat exchanger assembly 1200 will be described. The heat exchanger assembly 1200 is the same as the heat exchanger assembly 1100 described above, except that the surface of the side and bottom sections 1152, 1154 of the portion 1128 is provided with dimples 1202 and the surface of the central channel 1150 of the portion 1128 is provided with fins 1204. The dimples 1202 and the fins 1204 increase the heat exchanging surface area of the portions of the passages to which they are connected, thereby improving the heat exchanging efficiency of the portion 1128. It is contemplated that the dimples 1202 or the fins 1204 could be omitted. It is also contemplate that dimples and/or fins could be provided on other portions of the heat exchanger assembly 1200. It is contemplated that features other than dimples and fins that increase the heat exchanging surface area of the heat exchanger assembly 1200 could be provided instead of or in addition to the dimples 1202 and fins 1204. It is contemplated that portions of the heat exchanger assemblies previously described above with respect to FIGS. 4 to 37 could also be provided with dimples, fins and/or other features increasing the heat exchanging surface area.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A heat exchanger assembly comprising:
a front portion;
a middle portion rearward of the front portion;
a rear portion rearward of the middle portion, at least one of the front and rear portions being curved from the middle portion, the at least one of the front and rear portions extending below the middle portion;
a top part; and
a bottom part disposed below the top part and being joined to the top part,
at least one of the top and bottom parts defining a recess, the top and bottom parts defining therebetween a passage formed in part by the recess, a width of the passage varying along a length of the heat exchanger assembly, the passage having an inlet and an outlet.

2. The heat exchanger assembly of claim 1, wherein the front portion is curved from the middle portion.

3. The heat exchanger assembly of claim 2, wherein the rear portion is curved from the middle portion.

4. The heat exchanger assembly of claim 1, wherein the bottom part defines the recess.

5. The heat exchanger assembly of claim 4, wherein the top part defines at least one other recess, the passage being also formed in part by the at least one other recess.

6. The heat exchanger assembly of claim 1, wherein the passage extends longitudinally along a first lateral side of the heat exchanger, then laterally along the rear portion, then longitudinally along a second lateral side of the heat exchanger and then laterally along the front portion.

7. The heat exchanger assembly of claim 1, wherein the passage extends at least in part along the middle portion and the at least one of the front and rear portions.

8. The heat exchanger assembly of claim 1, wherein at least a portion of the passage defined in the middle portion is wider than at least another portion of the passage defined in the middle portion.

9. The heat exchanger assembly of claim 1, wherein at least a portion of the passage is thicker than at least another portion of the passage.

10. The heat exchanger assembly of claim 1, wherein the recess is a first recess and the passage is a first passage;
the heat exchanger assembly further comprising another part defining a second recess, the other part being joined to one of the top and bottom parts, the other part and the one of the top and bottom parts to which the other part is joined defining therebetween a second passage formed in part by the second recess, the second passage having another inlet and another outlet, the second passage being fluidly separate from the first passage.

11. The heat exchanger assembly of claim 10, wherein the other part is curved; and
wherein the other part is joined to the middle portion and the at least one of the front and rear portions being curved from the middle portion.

12. The heat exchanger assembly of claim 11, wherein the first passage extends at least in part longitudinally along one side of the second passage.

13. The heat exchanger assembly of claim 1, wherein the passage extends at least in part along the front portion; wherein a width of a portion of the passage extending along the front portion is at least three quarters of a width of the front portion.

14. The heat exchanger assembly of claim 1, wherein the inlet of the passage is rearward of the outlet of the passage; and
wherein from the outlet, the passage extends forwardly then laterally.

15. The heat exchanger assembly of claim 2, wherein the recess extends at least in part along the middle portion and the front portion and is curved to follow a curvature defined by the front portion and the middle portion.

16. A snowmobile comprising:
a frame having a tunnel;
a motor supported by the frame;
at least one ski connected to the frame;
a rear suspension assembly connected to the tunnel;
a drive track disposed around the rear suspension assembly and at least in part below the tunnel, the drive track being operatively connected to the motor; and
drive sprockets operatively connecting the motor to the drive track,
at least a portion of a top of the tunnel and at least a portion of a front of the tunnel being formed by a heat exchanger assembly adapted to have at least one motor fluid flowing therethrough for cooling the at least one motor fluid, the heat exchanger assembly comprising:
a front portion;
a middle portion rearward of the front portion, the front portion being curved from the middle portion to form the front portion of the tunnel, the front portion extending below the middle portion;
a rear portion rearward of the middle portion, the middle and rear portions forming the top portion of the tunnel;
a top part; and
a bottom part disposed below the top part and being joined to the top part,
at least one of the top and bottom parts defining a recess, the top and bottom parts defining therebetween a passage formed in part by the recess, a width of the passage varying along a length of the heat exchanger assembly, the passage having an inlet and an outlet,
the passage extending at least in part along the middle portion and the front portion, a first portion of the passage disposed along the front portion forward of an axis of rotation of the drive sprockets being wider than a second portion of the passage disposed rearward of the axis of rotation of the drive sprockets.

17. The snowmobile of claim 16, wherein the bottom part defines the recess.

18. The snowmobile of claim 17, wherein the top part defines at least one other recess, the passage being also formed in part by the at least one other recess.

19. The snowmobile of claim 16, wherein the rear suspension assembly has rear idler wheels and middle idler wheels disposed forward and above the rear idler wheels;
wherein at least a portion of the passage defined in the middle portion is wider than at least another portion of the passage defined in the middle portion, the wider portion of the passage defined in the middle portion is disposed at least in part forward of an axis of rotation of the middle idler wheels.

20. The snowmobile of claim 16, wherein the recess is a first recess and the passage is a first passage adapted to have a first motor fluid flowing therethrough;

the heat exchanger assembly further comprising another part defining a second recess, the other part being joined to one of the top and bottom parts, the other part and the one of the top and bottom parts to which the other part is joined defining therebetween a second passage formed in part by the second recess, the second passage having another inlet and another outlet, the second passage being fluidly separate from the first passage, the second passage being adapted to have a second motor fluid flowing therethrough.

21. The snowmobile of claim 16, wherein the inlet and outlet of the passage fluidly communicate with the motor.

22. The heat exchanger assembly of claim 1, wherein at least one of the inlet and outlet is defined in the at least one of the front and rear portions extending below the middle portion.

23. The heat exchanger assembly of claim 22, wherein:
the at least one of the front and rear portions extending below the middle portion is the front portion; and
the outlet is defined in the front portion.

24. The heat exchanger assembly of claim 1, wherein:
the inlet is disposed near a first end of the passage; and
the outlet is disposed near a second end of the passage.

25. The heat exchanger assembly of claim 1, wherein the inlet and outlet are adapted for fluidly communicating with a motor.

* * * * *